US010701119B2

(12) United States Patent
Oyman

(10) Patent No.: US 10,701,119 B2
(45) Date of Patent: Jun. 30, 2020

(54) ADAPTIVE VIDEO STREAMING USING DYNAMIC RADIO ACCESS NETWORK INFORMATION

(71) Applicant: Intel IP Corporation, Santa Clara, CA (US)

(72) Inventor: Ozgur Oyman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 6 days.

(21) Appl. No.: 15/570,826

(22) PCT Filed: Dec. 22, 2015

(86) PCT No.: PCT/US2015/067428
§ 371 (c)(1),
(2) Date: Oct. 31, 2017

(87) PCT Pub. No.: WO2016/204815
PCT Pub. Date: Dec. 22, 2016

(65) Prior Publication Data
US 2018/0139254 A1 May 17, 2018

Related U.S. Application Data
(60) Provisional application No. 62/180,520, filed on Jun. 16, 2015.

(51) Int. Cl.
*H04L 29/06* (2006.01)
*H04N 21/845* (2011.01)
(Continued)

(52) U.S. Cl.
CPC .... *H04L 65/4069* (2013.01); *H04L 29/06503* (2013.01); *H04L 65/4084* (2013.01);
(Continued)

(58) Field of Classification Search
CPC .......................... H04L 65/4084; H04L 65/601
See application file for complete search history.

(56) References Cited

U.S. PATENT DOCUMENTS 8,713,105 B2 * 4/2014 Ramalingam ....... H04L 12/1822
379/202.01
9,210,208 B2 * 12/2015 Ramaswamy ...... H04L 65/4069
(Continued)

FOREIGN PATENT DOCUMENTS

EP 2922266 A1 * 9/2015 ..... H04N 21/234345

OTHER PUBLICATIONS

Oyman, Ozgur. "Proposed Client-to-Server Interface Signaling Enhancements," Source: Intel Corporation, Huawei Technologies. International Organisation for Standardisation Organisation Internationale de Normalisation ISO/IEC JTC1/SC29/WG11 Coding of Moving Pictures and Audio. ISO/IEC JTC1/SC29/WG11 MPEG2013/M34307, Jul. 2014, Sapporo, Japan. XP030062680, 3 pages.
(Continued)

*Primary Examiner* — Lashonda T Jacobs
(74) *Attorney, Agent, or Firm* — Eschweiler & Potashnik, LLC

(57) ABSTRACT

A network device (e.g., an evolved Node B (eNB), server, or other network entity) or a client device (e.g., a user equipment (UE)) can operate over various interfaces according to a dynamic adaptive streaming over hypertext transfer protocol (DASH) assisting network element (DANE). A media path interface can deliver streaming media content to the client device from the media origin server based on a set of parameters provided via a DANE server interface. A client-to-DANE interface can receive a set of metric and status messages from the client device concurrent with a delivery of the streaming media content. A content adaptation component can generate a modification of a media presentation
(Continued)

or related parameters based on the set of metric and status messages.

23 Claims, 16 Drawing Sheets

(51) Int. Cl.
    *H04N 21/2343*      (2011.01)
    *H04N 21/442*      (2011.01)
    *H04L 29/08*      (2006.01)
    *H04N 21/6371*      (2011.01)

(52) U.S. Cl.
    CPC .......... *H04L 65/605* (2013.01); *H04L 65/80* (2013.01); *H04L 67/2842* (2013.01); *H04N 21/23439* (2013.01); *H04N 21/234336* (2013.01); *H04N 21/44209* (2013.01); *H04N 21/6371* (2013.01); *H04N 21/8456* (2013.01); *H04L 65/601* (2013.01); *H04L 67/02* (2013.01); *H04L 67/28* (2013.01)

(56) References Cited

U.S. PATENT DOCUMENTS

| | | | |
|---|---|---|---|
| 9,276,984 B2 | 3/2016 | Lai et al. | |
| 9,838,452 B2* | 12/2017 | Bae | H04N 21/2402 |
| 10,171,854 B2* | 1/2019 | Yamagishi | H04N 21/8456 |
| 2008/0120178 A1* | 5/2008 | Martinez | G06Q 30/02 |
| | | | 705/14.39 |
| 2009/0006643 A1* | 1/2009 | Lee | H04N 21/23424 |
| | | | 709/231 |
| 2009/0254672 A1* | 10/2009 | Zhang | H04N 21/23106 |
| | | | 709/231 |
| 2010/0287585 A1* | 11/2010 | Frondal | H04N 7/162 |
| | | | 725/31 |
| 2011/0060792 A1 | 3/2011 | Ebersviller | |
| 2013/0286868 A1* | 10/2013 | Oyman | H04W 24/06 |
| | | | 370/252 |
| 2014/0089467 A1* | 3/2014 | Beck | H04L 67/02 |
| | | | 709/219 |
| 2014/0115094 A1 | 4/2014 | Dao et al. | |
| 2014/0195651 A1 | 7/2014 | Stockhammer et al. | |
| 2014/0317306 A1* | 10/2014 | Giladi | H04L 65/602 |
| | | | 709/231 |
| 2014/0357247 A1* | 12/2014 | Assuncao | H04W 4/029 |
| | | | 455/418 |
| 2014/0365556 A1 | 12/2014 | Rehan et al. | |
| 2014/0365613 A1* | 12/2014 | Phillips | H04L 65/60 |
| | | | 709/219 |
| 2015/0012661 A1* | 1/2015 | Elmore | H04L 65/4084 |
| | | | 709/231 |
| 2015/0100996 A1 | 4/2015 | Freeman et al. | |
| 2015/0113604 A1* | 4/2015 | Oyman | H04L 63/10 |
| | | | 726/4 |
| 2015/0271233 A1 | 9/2015 | Bouazizi | |
| 2015/0326572 A1* | 11/2015 | Oyman | H04N 21/23439 |
| | | | 726/4 |
| 2016/0014184 A1* | 1/2016 | Rehan | H04L 65/602 |
| | | | 709/219 |
| 2016/0330500 A1* | 11/2016 | Houdaille | H04L 65/4084 |
| 2016/0373546 A1* | 12/2016 | Lotfallah | H04L 65/4084 |
| 2018/0176613 A1* | 6/2018 | Gouache | H04L 65/4084 |
| 2018/0199075 A1* | 7/2018 | Wang | H04N 21/44029 |
| 2018/0332089 A1* | 11/2018 | Lohmar | H04L 63/0428 |

OTHER PUBLICATIONS

Thomas, Emmanuel, "Enhancing MPEG Dash Performance Via Server and Network Assistance." 8 pages. 2015.
European Office Action dated Dec. 10, 2016 for European Patent Application 15 826 256.8.
International Search Report dated Mar. 7, 2016 for International Application PT/US2015/067428.
Oyman, Ozgur. "Proposed Set of SAND Parameters." International Organisation for Standardisation Organisation Internationale de Normalisation, ISO/IEC JTC/SC29/WG11. Coding of Moving Pictures and Audio. ISO/IEC JTC1/SC29/WG11 MPEG2015/M35964, Feb. 2015, Geneva Switzerland. Source: Intel Corporation, Status: For Agreement. 9 pages.
Information Technology—Dynamic adaptive streaming over HTTP (DASH)—Part 5: Server and network assisted DASH (SAND). ISO/IEC JTC 1/SC 29 N. Feb. 19, 2015. ISO/IEC CD 23009-5, ISO/IEC JTC 1/SC 29/WG 11. 35 pages.
Bailer, Werner. Text of white paper on MPEG-7 Audio Visual Description Profile (AVDP). International Organisation for Standardisation, Organisation Internationale de Normalisation. ISO/IEC JTC1/SC29/WG11. Coding of Moving Pictures and Audio. ISO/IEC JTC1/SC29/WG11 N13869. Aug. 2013. Vienna, Austria. Status: Final. Source: Communication. 5 pages.
"Reply to I.S. on MPEG-DASH." Source: Convenor. International Organisation for Standardisation Organisation Internationale De Normalisation ISO/IEC JTC1/SC29/WG11, Coding of Moving Pictures and Audtio. ISO/IEC JTC1/SC29/WG11 N15241, Feb. 2015, Geneva, Switzerland. Tdoc S4 (15) 0282. TSG SA#83 meeting. Apr. 13-17, 2015, Bratislava, Slovakia.

* cited by examiner

```
Type     : PER, Metrics and Status Messages
Sender   : caching DANE or DASH client
Receiver : DASH client (and intermediate DANEs)

{
  "definitions": {
    "throughput": {
      "type": "object",
      "properties": {
        "guaranteedThroughput": {
          "type": "unsignedInt",
          "description": "Specifies a guaranteed throuhgput in bit/s.
Provides the guarantee for the throughput in a sense that the download time
of a resource of size S bytes and from receiving the first byte to receiving
the last byte is at most S*8 divided by the value of the attribute. This
guarantee is provided with the below value of the percentage of certainty and
holds for a request from the DASH client w/o any other concurrent HTTP
requests."
        },
        "percentage": {
          "type": "unsignedInt",
          "description": "specifies the certainty of the above guarantee. The
certainty of the guarantee is expressed as a percentage from 0 to 100. If not
present, the default value is 100."
        }
      },
      "required": ["guaranteedThroughput"]
    }
  },// end definitions "oneOf": [

{ "type": "array",
    "description": "A list of baseURL throughput information.",
    "items": {
```

FIG. 5

```
    "allOf": [
      { "$ref": "#/definitions/throughput" },
      { "properties": {
          "baseURL": {
            "type": "anyURI",
            "description": "Provides the base URL for the associated resources, i.e. the throughput holds for all resources referenced by this base URL."
          }
        },
        "required": ["baseURL"]
      }
    ]
  }
}, { "type": "array",
  "description": "A list of repId throughput information.",
  "items": {
    "allOf": [
      { "$ref": "#/definitions/throughput" },
      { "properties": {
          "repID": {
            "type": "string",
            "description": "Provides the value for the representation id, i.e. throughput holds for all resources associated to a Representation with the value of the parameter."
          }
        },
        "required": ["repId"]
      }
    ]
  }
}
]
}
```

FIG. 6

```
Type     : PER, PED, Metrics and Status Messages
Sender   : Server, DANE or 3rd party server, or DASH client
Receiver : DASH client or DANE {
    "qosInformation" : {
        "gbr" : {
            "Type" : "Int",
            "Cardinality" : "0",
            "Description" : "Guaranteed bit rate in kbps between the
DANE and DASH client, denoting the end to end guaranteed bit rate at the IP
layer bearer that the service provider delivers to the DASH client."
        },
        "mbr" : {
            "Type" : "Int",
            "Cardinality" : "0",
            "Description" : "Maximum bit rate in kbps between the
DANE and DASH client, limiting end to end bit rate that the service provider
delivers the DASH client and denoting the end to end maximum bit rate at the
IP layer bearer that the service provider delivers to the DASH client."
        },
        "delay" : {
            "Type" : "Int",
            "Cardinality" : "0",
            "Description" : "Packet layer budget in milli-seconds
(ms) denoting the maximum packet delay encountered at the IP layer with a
confidence level of 98 percent. For TCP-based video streaming applications
relevant for DASH, it is recommended that Delay equals 300 ms."
        },
        "pl" : {
            "Type" : "Int",
            "Cardinality" : "0",
            "Description" : "Packet loss parameter, where packet loss
rate equals 10^(-PL/10). For TCP-based video streaming applications relevant
for DASH, it is recommended that PL=60 such that the packet loss rate equals
10^(-6)."
        }
    }
}
```

FIG. 7

```
Type     : PED
Sender   : Server, DANE or 3rd party server
Receiver : DANE or 3rd party server
```

```
{
    "bwInformation" : {

"minBandwidth" : {
            "Type" : "Int",
            "Cardinality" : "M",
            "Description" : "Minimum required bandwidth of the
service, extracted from the MPD."
        },
        "maxBandwidth" : {
            "Type" : "Int",
            "Cardinality" : "M",
            "Description" : "Maximum required bandwidth of the
service, extracted from the MPD."
        },
        "clientID" : {
            "Type" : "String",
            "Cardinality" : "M",
            "Description" : "Client identifier."
        }
    }
}
```

FIG. 8

| | | |
|---|---|---|
| minBandwidth | Int | Minimum required bandwidth of the service, extracted from the MPD given by the sum of all MPD@minBandwidth of all media components simultaneously (not mutually exclusive) selectable by the DASH client plus HTTP/TCP/IP overhead and TCP messages for flow control.<br><br>If this attribute is not present then minBandwidth is given by the sum of MPD@bandwidth attributes of all media components of the available media presentation corresponding to representations or subrepresentations with lowest bandwidth simultaneously (not mutually exclusive) selectable by the DASH client plus HTTP/TCP/IP overhead and TCP messages for flow control.<br><br>If the client is expected to access multiple MPDs, then minBandwidth is calculated by summing up the minimum bandwidth values extracted from each MPD. |
| maxBandwidth | Int | Maximum required bandwidth of the service, extracted from the MPD given by the sum of all MPD@maxBandwidth of all media components simultaneously (not mutually exclusive) selectable by the DASH client plus HTTP/TCP/IP overhead and TCP messages for flow control.<br><br>If this attribute is not present then maxBandwidth is given by the sum of MPD@bandwidth attributes of all media components of the available media presentation corresponding to representations or subrepresentations with highest bandwidth simultaneously selectable (not mutually exclusive) by the DASH client plus HTTP/TCP/IP overhead and TCP messages for flow control.<br><br>If the client is expected to access multiple MPDs, then maxBandwidth is calculated by summing up the maximum bandwidth values extracted from each MPD. |
| clientID | String | Client identifier |

FIG. 9

```
Sender: Server, DANE or 3rd party server, or DASH client

Receiver: Server, DANE or 3rd party server, or DASH client

Type: PED, PER, Metrics and Status Messages

"Transcoding" : {

"Codecs" : {
           "Type" : "String",

"Cardinality" : "M",

"Description" : "Specifies the requested MIME
             type."                                              ⁊,
                profile and level information where applicable."

},

"MIMEType" : {
```

FIG. 10

```
"Bandwidth" : {

"Type" : "Int",

"Cardinality" : "M",

"Description" : "Specifies the requested
    bandwidth, where definition of the bandwidth
    aligns with that for the @bandwidth attribute in
    ISO/IEC 23009-1."
"FrameRate" : {

"Type" : "Int",

"Cardinality" : "O",

"Description" : "Specifies the requested output
    frame rate (or in the case of interlaced, half
    the output field rate) of the video media type".
"Width" : {

"Type" : "Int",

"Cardinality" : "O",

"Description" : "Specifies the requested
    horizontal visual presentation size of the video
    media type."

},

"Height" : {

"Type" : "Int",

"Cardinality" : "O",

"Description" : "Specifies the requested vertical
    visual presentation size of the video media
    type."
```

FIG. 11

Sender-side logic

```
RequestTranscoding()
{
  send_TranscodingRequest(&Codecs, &MIMEType, &Bandwidth, &FrameRate, &Width, &Height);
}
```

Receiver-side logic

```
Transcoder()
{
  receive_TranscodingRequest(&Codecs, &MIMEType, &Bandwidth, &FrameRate, &Width, &Height);

if (transcoding_supported)
  then
       generate_DASH_content(&Codecs, &MIMEType, &Bandwidth, &FrameRate, &Width, &Height);
       update_MPD();
  end
}
```

FIG. 12

ADAPTIVE VIDEO STREAMING USING DYNAMIC RADIO ACCESS NETWORK INFORMATION

REFERENCE TO RELATED APPLICATIONS

This application is a National Phase entry application of International Patent Application No. PCT/US2015/067428 filed Dec. 22, 2015, which claims priority to U.S. Provisional Application 62/180,520 filed on Jun. 16, 2015, entitled "DYNAMIC ADAPTIVE STREAMING OVER HTTP" in the name of Ozgur Oyman and is hereby incorporated by reference in their entirety.

FIELD

The present disclosure relates to video streaming, and more specifically, to adaptive video streaming using dynamic radio access network information.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the UE. The downlink (DL) transmission can be a communication from the node (e.g., eNB) to the UE, and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

FIGS. 5-6 illustrate representations one or more message lines or data for utilization of the throughput parameter in accordance with one or more embodiments.

FIG. 7 illustrates example message information related to quality of service (QoS) information in accordance with one or more aspects.

FIGS. 8-9 illustrate example message information related to bandwidth information in accordance with one or more aspects.

FIGS. 10-11 illustrate example message information related to transcoding information in accordance with one or more aspects.

FIG. 12 illustrates another example of message data between receiver side logic and a transmit side logic in accordance with one or more aspects described herein.

DETAILED DESCRIPTION

Figure 1:
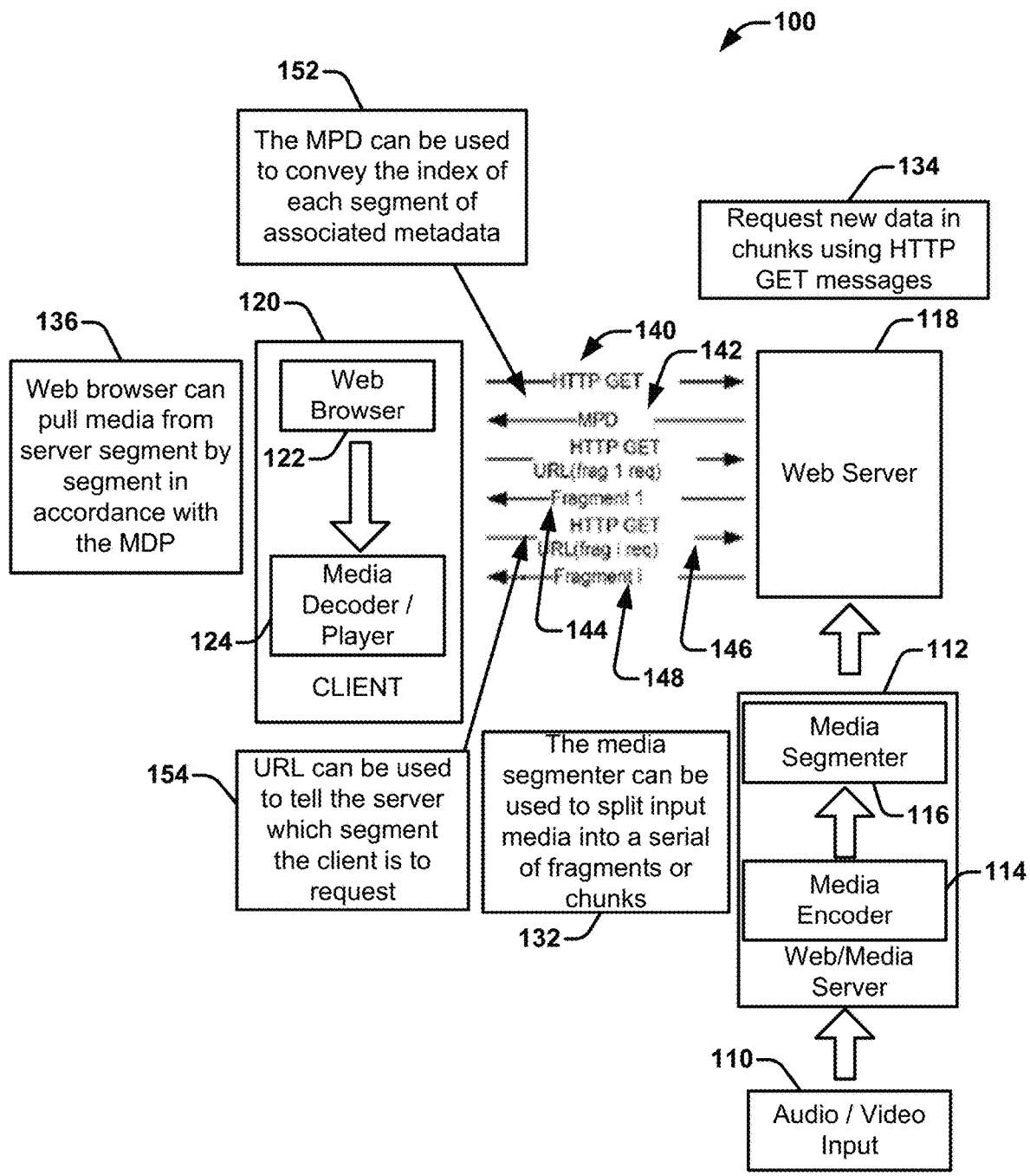
FIG. 1 illustrates a block diagram at a client and servers for dynamic adaptive streaming over hypertext transfer protocol (HTTP) (DASH) in accordance with one or more aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, a circuit or a circuit element, an object, an executable, a program, a storage device, a computer, a tablet PC and/or a mobile phone with a processing device. By way of illustration, an application running on a server and the server can also be a component. One or more components can reside within a process, and a component can be localized on one computer or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components or elements without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies, hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming Dynamic adaptive streaming over HTTP (DASH), which can be a standardized HTTP streaming protocol.

In DASH, a media presentation description (MPD) metadata file can provide information on the structure (media representation configurations, attributes or parameters) and different versions (e.g., different formats, different qualities, different media representation copies with different quality parameters, different configurations, or different attributes, etc.) of the media content representations stored in the server including different bitrates, frame rates, resolutions, codec types, or other media representation configurations.

In addition, DASH can also specify segment formats. The MPD metadata file can contain information on the initialization and media segments for a media player (e.g., the media player can look at initialization segment to determine a container format and media timing information) to ensure mapping of segments into a media presentation timeline for switching and synchronous presentation with other representations. Based on this MPD metadata information that describes the relation of the segments in forming a media presentation, clients (or client devices) can request the segments using HTTP GET or partial GET methods. The client can fully control the streaming session. For example, the client can manage an on-time request and smooth playout of the sequence of segments, and potentially adjusting bitrates or other attributes (e.g., to react to changes of the device state or the user preferences.

A DASH client can receive multimedia content by downloading the segments through a series of HTTP request response transactions. DASH processes can provide the ability to dynamically switch between different bit rate representations of the media content as the available bandwidth changes. Thus, DASH can allow for fast adaptation to changing network and wireless link conditions, user preferences and device capabilities, such as a display resolution, the type of central processing unit (CPU) employed, or memory resources available, and so forth.

In DASH, a media presentation description (MPD) metadata file can provide information on the structure and different versions of the media content representations stored in a web and/or media server 112, as illustrated in FIG. 1. The different versions of the media content representations can include different bitrates, frame rates, resolutions, codec types, or other similar types of information. In addition, DASH can also specify the segment formats, which can contain information on initialization and media segments for a media engine to ensure mapping of segments into a media presentation timeline for switching and synchronous presentation with other representations. Based on the MPD metadata information, which describes the relationship of the segments and how the segments form a media presentation, a client 120 can request the segments using an HTTP GET 140 message or a series of partial GET messages. The client can control the streaming session, such as managing an on-time request and smooth playout of a sequence of segments, or potentially adjusting bitrates or other attributes, to react to changes of a device state or a user preference.

FIG. 1 further illustrates a DASH-based streaming framework. A media encoder 114 in the web/media server 112 can encode an input media from an audio/video input 110 into a format for storage or streaming. A media segmenter 116 can be used to split the input media into a serial of fragments or chunks 132 of bits, which can be provided to a web server 118. The client 120 can request new data in chunks using HTTP GET messages 134 sent to the web server (e.g., HTTP server).

For example, a web browser 122 of the client 120 can request multimedia content using a HTTP GET message 140. The web server 118 can provide the client with a MPD 142 for the multimedia content. The MPD can be used to convey the index of each segment and the segment's corresponding locations, as shown in the associated metadata information 152. The web browser 122 can pull media from the server segment by segment in accordance with the MPD 142 as shown in 136. For instance, the web browser 122 can request a first fragment using a HTTP GET URL (frag 1 req) 144. A uniform resource locator (URL) or universal resource locator can be used to tell the web server, which segment the client is to request 154. The web server can provide the first fragment (i.e., fragment 1 146). For subsequent fragments, the web browser can request a fragment i 250 using a HTTP GET URL (frag i req) 148, where i is an integer index of the fragment. As a result, the web server can provide a fragment i 150. The fragments can be presented to the client via a media decoder or player 124.

Figure 2:
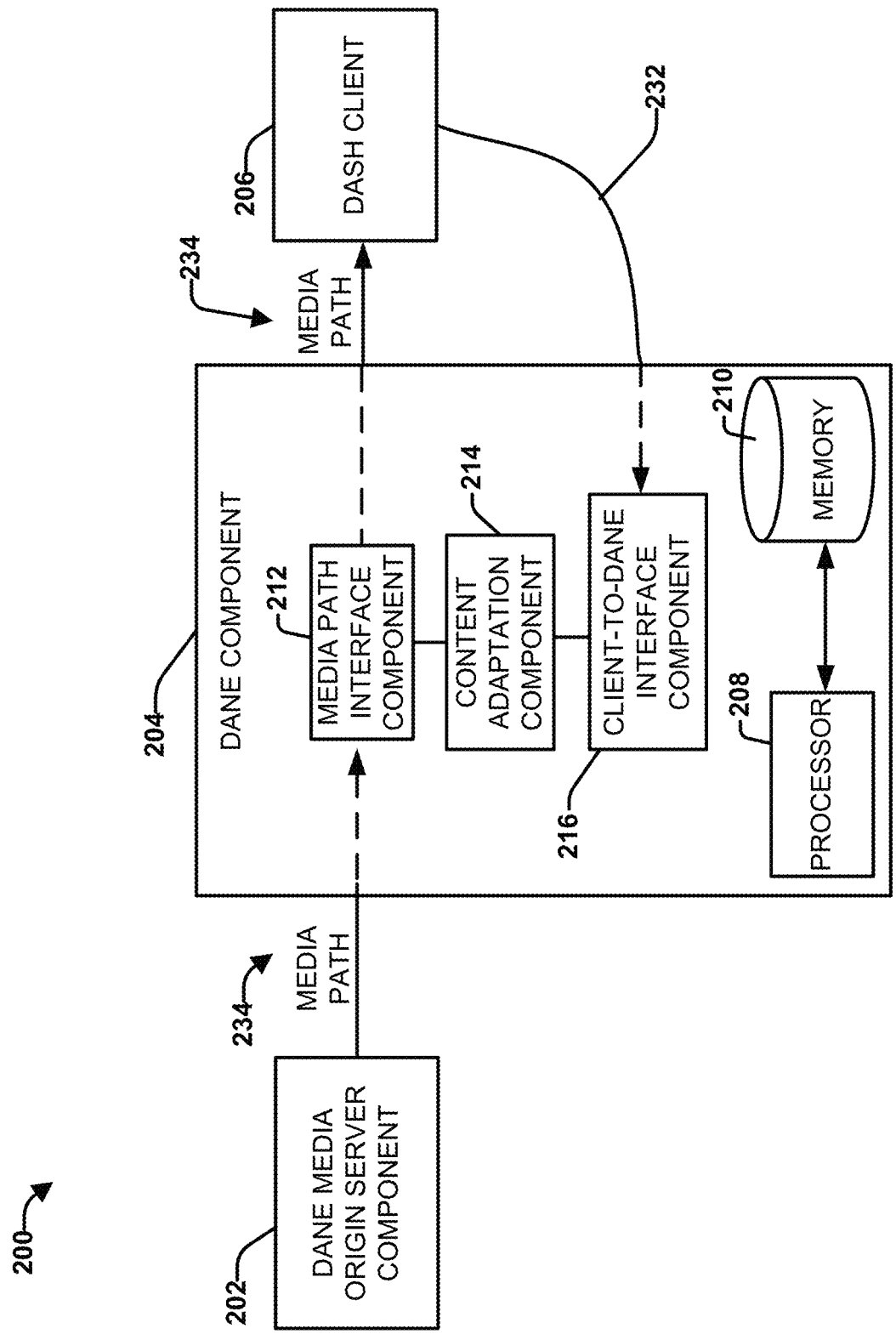
FIG. 2 illustrates another block diagram at a client and servers for dynamic adaptive streaming over hypertext transfer protocol (HTTP) (DASH) in accordance with one or more aspects.

FIG. 2 illustrates an example of a DASH network environment 200 comprising various components for interfacing streaming media content in accordance with various aspects described herein. In order to enhance the delivery of DASH content, server and network assisted DASH (SAND) techniques can provide messages between a DASH client 206 and network element(s). The messages can also be between the network element(s). These messages, for example, can improve a streaming session of streaming content over an HTTP channel to the client 206 by providing information about real time operational characteristics of the networks, servers, proxies, caches, content distribution content delivery networks (CDNs) as well as the DASH client's performance.

The DASH network environment 200 can include a SAND based architecture comprising a DASH client 206, which can comprise a wireless phone (e.g., user equipment (UE)), a mobile device (e.g., personal digital assistant, laptop, etc.) or other target device capable of rendering streaming content in a display. The DASH client 206 can also be a media player, web browser, decoder, or other video streaming component of a video streaming device. The DASH client device 206 can further be communicatively coupled to DASH-aware network elements (DANE) (e.g., the DANE media origin server component 202, the DANE component 204, or one or more other network devices or servers), which have at least minimum intelligence about DASH based protocols or formats. For example, the DANE media origin server component 202 and the DANE component 204 can be (DASH-) aware that the delivered streaming media content (e.g., objects, segments, sequences or other chunks of media) are DASH-formatted objects such as the MPD or DASH segments, and can prioritize, parse or even modify such streaming content or objects.

The DANE component 204 can comprise a proxy server or other network device that can be located at a last hop to the DASH client 206, or, in other words, as a final intermediary device communicatively connected to the DASH client 206 that is DASH aware. The DANE component 204 can also be other network devices (e.g., a base station, an evolved NodeB, network entity, or other network component) or reside thereon as a component circuitry or application that operates as an intermediary for DASH based streaming media to the DASH client 206. The DANE component 204 comprises the processor 208 and one or more data stores 210 that can operate to execute instructions or facilitate operations for one or more executable components. The components can comprise, for example, the media path interface component 212, the content adaption component 214, and the client-to-DANE interface component 216.

The DANE media origin server component 202 can facilitate uploading, storage, formatting, production and delivery of media streams to and from memory based on client requests (e.g., GET messages) as a first hop or source of streaming content in a content delivery network. The DANE media origin server 202 can have multiple different versions or configuration settings or parameters related to segments of media content representations. This media content can then be delivered or streamed (via the media path interface 234) to one or more clients 206 or other network components (e.g., proxy server, eNB or the like) for further distributed or rendered in a display. The DANE media origin server 202 can comprise and control a media presentation description (MPD) metadata file that further provides information on the structure and different versions of the media content representations stored in the server (including different bitrates, frame rates, resolutions, codec types, or other related media configuration settings or parameters).

Furthermore, DASH network environment 200 can also include regular network elements (not shown), which are DASH unaware and treat DASH delivery objects as any other object, but can be present on the path between the DANE media origin server component and the DASH client 206, e.g. transparent caches, routers, or other such components.

The DANE media origin server 202 can operate to deliver media content via the media path 234 to the DANE component 204. The DANE component 204 as a proxy server can store the content for a future or a current request client request. If a request for the content is current, then the DANE component 204, rather than the DANE media origin server 202 can directly stream the content for rendering in real time of a display in response to the request. The DANE component 204 can further control and manage the client request and dynamically operate the delivery of the streaming content based on data presented to the DASH client 206 and messages exchanged with the DASH client over different interfaces on the network.

The DANE component 204, operating as proxy for the origin server 202, can have access to the MPD metadata file and interact with the client during the streaming, before the client request or after in order to dynamically modify the clients experience to optimize a quality of experience (QoE). Thus, in a similar manner as the origin server 202, the DANE component 204 can specify segment formats, i.e., containing information on the initialization and media segments to ensure mapping of segments into media presentation timeline for switching and synchronous presentation with other media content representations/presentations dynamically. Based on this MPD metadata information that describes the relation of the segments and how they form a media presentation, clients request the segments using HTTP GET or partial GET methods. The client fully controls the streaming session, i.e., it manages the on-time request and smooth playout of the sequence of segments, potentially adjusting bitrates or other attributes, e.g., to react to changes of the device state or the user preferences being messaged in a dynamic fashion, as well as changes in the network environment. This allows for enabling adaptive streaming according to certain protocols and interfaces, which enables improving the user experience.

In the absence of such dynamic adaptation operations, if something goes wrong in the network, or there is a mismatch between the client capabilities and characteristics of the content, this could lead to poor streaming experience, especially in a congested environment, which can result in re-buffering events. For example, network throughput could possibly not be high enough to stream the desired content to the DASH client 206, which could cause obstruction and a poor user experience.

With adaptive streaming, the DASH client 206 can dynamically change the video configuration, bit rates, resolutions and other parameters adaptively to be able to fetch the content from the server. Therefore, even if the network throughput goes down, for example, the streaming content would be continuous and not be interrupted because the delivery of the content itself or the media player could have switched to a lower version of the content or a different configuration in order to make sure the streaming can remain continuous.

In addition, the DANE component 204 can operate to provide current network conditions or parameters to the DASH client 206 in order for the DASH client 206 to dynamically select available parameters, defaults, media content versions or configurations of the media during streaming in response to a congestion event. These event indicators (e.g., slowing throughput, a re-buffering, a drop in network bandwidth available, other network parameter falling below a predetermined threshold), or on the fly as a network condition changes. For example, the content adaptation component 214 can generate a modification of a media presentation of a sequence of segments, the delivery of the streaming media content, or the streaming media content during the delivery to the client device via the media path 234 controlled via the media path interface component 212. The modification to the streaming content can be based on the metric and status messages received via the client-to-DANE interface component 216, which in turn can also be at least partially a function of parameters messages communicated to the DASH client 206.

The modification, for example, can include a transcoding or a transrating of the media for the delivery of a presentation of the media being streamed, or the media presentation of a sequence of media segments (e.g., as video content, audio content, metadata from a MDA metadata file, or other such content. Transacoding can be a conversion process by which media content is converted to one encoding or another, such as for movie data file formats (e.g., PAL, SECAM, NTSC, etc.) audio files (e.g., MP3, WAV, etc.), character encoding formats or the like. Transrating can be a process by which the media content is converted to a different bit rate while maintaining the original format, for example, which can enable the client to receive media in a smaller storage space or be delivered more efficiently using a reduced bandwidth. The modification of the content can be, for example, a modification of the media itself, the delivery of the media or the media presentation of the sequence of segments. Further, the modification can be a function of or based on the metric and status messages received via the client 206 (e.g., via the client-to-DANE interface component 216.

Within the DANE network environment 200, different categories of messages can be exchanged in order to communicate steaming media content (e.g., videos, photos, audio, overlays, or other such streaming media content) as well as parameters or data related thereto. Each category, for example, can have particular interfaces and interfacing protocols designated with the type of data, the component facilitating or exchanging the communication and the connecting interface corresponding to the components.

For example, metrics and status messages can be messages capable of being sent from DASH clients (e.g., DASH client 206) to DANE based devices/components via an interface path or link 232, for example. In this context, the DANE media origin server/component 202 can serve DASH content via the media path 234 and in addition to its primary function also receive metric or status messages from the DASH client 206. The messages sent by the clients that carry metrics information (e.g., parameter values, quantized network conditions, properties of network parameters, states of a property, values related to available resources, or other similar values) can be referred to metrics messages. The messages sent by the clients that carry non-metrics information (e.g., requests, capabilities, bandwidths capabilities, indications of available resources, selections of versions, available values or configuration parameters, guarantees, versions or other metadata associated with a network conditions or parameters of a DANE component, server, base station, or a client device) are called status messages. The metrics and status messages can have a similar structure, however, be distinguished from one another because these messages can carry information of different nature.

In one example, the media path interface component 212 can communicatively couple a media origin server and a client device as part of the DANE component 204. The media path interface component 212 can also operate at the DASH client 206 or other network devices also in order to control the delivery of the media content originally or initially requested for rendering in the DASH client display or visual interface (not shown). The media path interface component 212 can deliver streaming media content to the client device from the media origin server based on a set of parameters (e.g., a media selection, a particular version, a resolution, bit rate, a frame rate codec, QoS, bandwidth, transcoding, transrating or other such parameters related to streaming media content). The client-to-DANE interface component 216 can control communications coming from the DASH client 232 via the path or link 232. The metric and status messages can be received from the client device concurrent with or simultaneous to a delivery of the streaming media content via the media path interface component 212 along the media path 234. The content adaptation component 214 can then modify the existing streaming content to smoothly and seamlessly provide the same streaming media content according to the metric and status messages being received.

In an aspect, the media path 234 or the client-to-DANE interface path 232 can comprise one direction of communication or unidirectional communication links corresponding to particular communications. The paths or links 234, 232 and others can comprise particular channels, addresses, wireless or wired ports, or configurations corresponding to or associated with each. Some paths or links can be bi-direction for full-duplex communication or communication of the same data in both directions, for example.

The metric and status messages, in other aspects, can be related to or include one or more throughput parameters, one or more quality of service parameters, and one or more transcoding/transrating parameters, which enable transcoding operations to be offloaded from the media origin server. The throughput parameters can comprise one or more indications, options or selections of a guaranteed throughput, a base universal resource locator (URL) throughput information, and a representative identifier throughput information. The quality of service parameters can comprise one or more of a guaranteed bit rate, a maximum bit rate, a delay time, and a packet loss. The transcoding parameters can comprise one or more indications of a codec parameter, a bandwidth, a frame rate, a Multipurpose Internet Mail Extensions (MIME) type, a height for vertical rendering of the streaming media content, and a width for horizontal rendering of the streaming media content.

Figure 3:
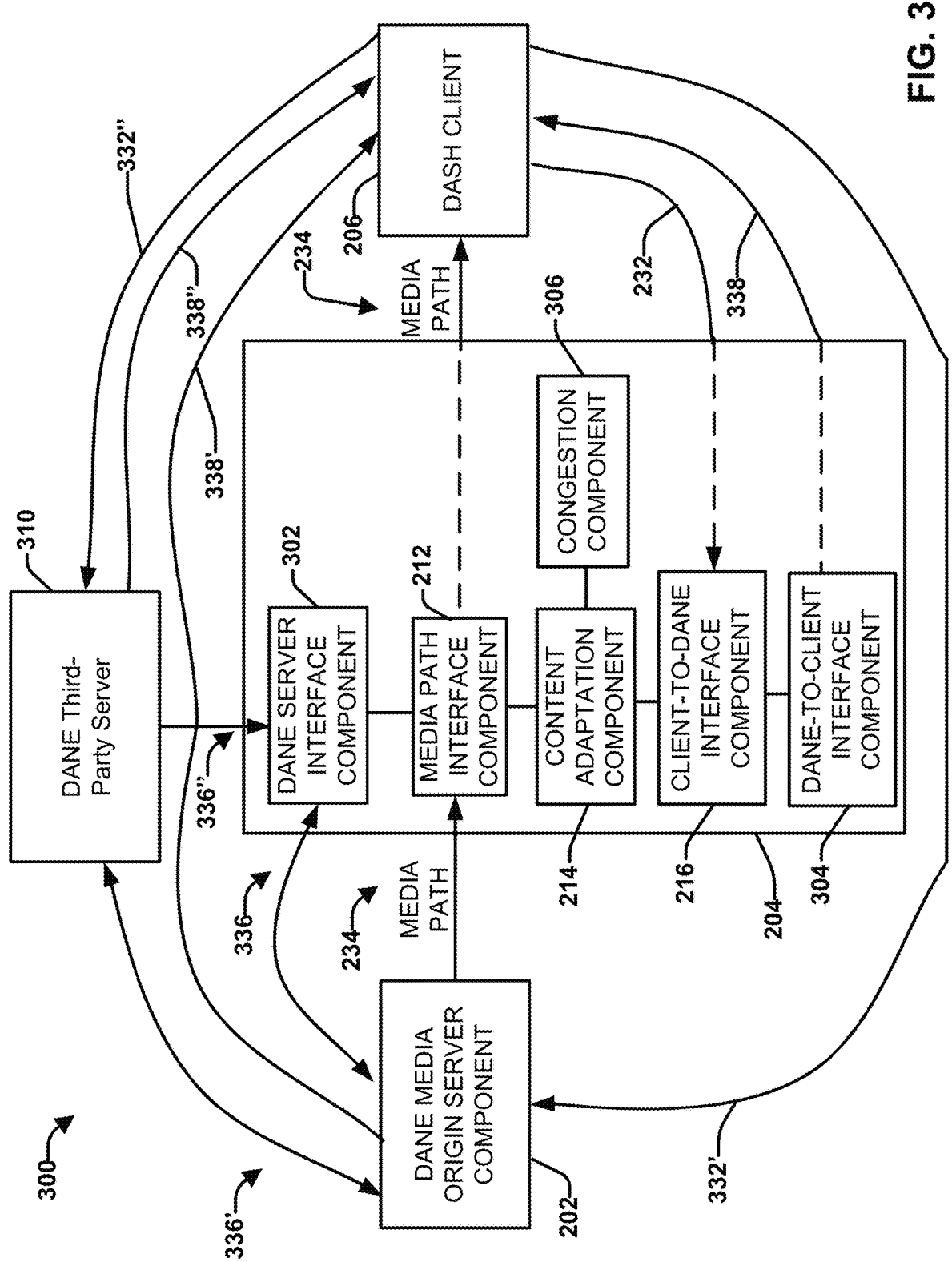
FIG. 3 illustrates another block diagram at a client and servers for dynamic adaptive streaming over hypertext transfer protocol (HTTP) (DASH) in accordance with one or more aspects.

FIG. 3 illustrates another example of a DASH network environment 300 comprising various components for dynamically interfacing streaming media content in accordance with various aspects described herein. The DASH network environment 300 comprises similar elements as described in FIG. 2 above, and further includes a DANE third-party server or other third party component 310. The DANE component 204 further comprises the DANE server interface component 302, the DANE-to-client interface component 304, and the congestion component 306.

The third party server 310 can be configured or operate similarly as the DANE component 204, which can also be a proxy server or other device with the DANE component 204, for facilitating dynamic streaming events or operations over a network from a DANE media origin server 202 to one or more DASH clients 206. Further, the DASH client 206 can also comprise similar components as the DANE component 204 for facilitating various interfaces for specific data and operations.

Other categories of messages can also be implemented in the network environment and components being illustrated, including the metric and status messages discussed above with regard to FIG. 2. Other categories can include parameter(s) enhancing delivery (PED) messages that can be exchanged between DANEs components/devices, and parameters enhancing reception (PER) messages that can be sent from DANE components/devices to the DASH client 206.

The PED messages can be exchanged between DANEs components or devices, such as between the DANE component 204 and the DANE media origin server component 202 via the communication link or path 336. In one example, this exchange of PED messages can be at the control of the DANE server interface component 302. Likewise, the exchange can be between the DANE media origin server component 202 and the DANE third party server 310 over the link 336' via a different server interface component (e.g., DANE server interface at the third party 310). In addition, the DANE server interface component 302 can further operate an exchange or a unidirectional reception of PED messages from the DANE third-party server 310 via communication path/link 336". The PED messages can be received at the DANE component 204 and processed according to one or more criteria, thresholds, indications or rankings of data/parameters of the PED messages.

In one embodiment, the PED messages can comprise quality of service parameter(s), bandwidth parameter(s), or transcoding/transrating parameters for transcoding operations to be offloaded from the media origin server 202 to the DANE server component 204. These parameters, for example, can be allocations of resources related to operations available to the DANE server component 204 as a proxy for the origin server 202. Transcoding operations can include bitrate streaming with different transcode qualities by generating equivalent segments of audio and/or video data based on the transcoding parameters. As such, media segments can be included in the media path 234 as input streams or equivalent chunks of data based on the segment boundaries identified as part of the parameters, wherein the input streams include different transcode qualities (e.g., resolutions, bitrates, time information or timestamps, different encoding versions, indexes, identifiers (IDs) or the like).

The DANE media server component 202 and the DANE component 204 can exchange PED messages via either uni-directionally or bi-directionally depending on the functionality of each DANE component (e.g., 204, 310, or 202). As such, the links 336, 336' and 336" can be bi-directional or uni-directional for the communication of PED messages. In one example, PED messages can be sent by the DANE third-party server 310 to the media origin 202 via link 336' or to the DANE component 204 via uni-directional link 336', in order to enhance delivery and dynamic adaptation of the streaming media content to the DASH client 206. In the reverse direction, PED messages containing content-specific data (e.g., parameters for media content, indications (request options) or indications selected (parameters value requests) for such media content, versions of media content, capabilities of devices/components requesting, or other data) can be sent from the media origin 202 to a third-party analytics server 310 in order to enable content-aware optimizations by the third-party analytics server 310.

Alternatively or additionally, the communication link 336" can be bi-directional also in order to facilitate dynamic adaptability and offloading operations via the DANE server interface component 302 over the link 336" to the third party server 310. This could enable further extension of the DANE component 204 as a proxy in a last network hop connection to a DASH client device 206, for example.

In other embodiments, the communication link 232 controlled by client-to-DANE interface 216 for reception of the metric and status messages can be uni-directional. The client-to-DANE interface 216 at the DANE component 204 operates to receive and process such message based on one or more indications, selections, requests of resources, capabilities, etc. expressed as metrics or status parameters, for example.

In another embodiment, the communication link 338 at the DANE component 204 can also be a uni-directional link, which is controlled by the DANE-to-client interface component 304 for PER messages. The PER messages can be sent from the DANE components to the DASH client 206 by being processed and transmitted according to particular criteria or parameters that provide indications or options of parameters, parameter values, or media content specification/configurations/versions available for the DASH client 206. The DASH client 206 in turn can communicate by request or selection related to the PER message data content via the metric and status messages over one or more links 232, 332' or 332", to the DANE component 204, the DANE media origin 202, or the third party server 310, for example.

Likewise, the DANE media origin server 202 and the DANE third party server 310 can also communicate PER messages to the DASH client 206 via paths or links 338' and 338", for example, which can be selectively activated based on network conditions such as congestion or resource availability according to particular requests by the DASH client 206, such as particular content, versions, configurations, parameters or other factors related to dynamically adapting or modifying already streaming media content for improving the QoE of the user. In an example embodiment, the PER messages can comprise an indication of a throughput, an indication of a quality of service, and an indication of a transcoding parameter that enables a transcoding operation to be offloaded from the media origin server 202 to the DANE component 204. These indications in the PER messages can server to provide which parameters are available for adjustment to affect the modification of the streaming media content via link 234 to the DASH client 206.

In one aspect, the third-party server 310 can receive metrics or status messages from the DASH client(s) 206 (e.g., via interface path/link 332') and send SAND messages (e.g., PER messages via link 338") to the DASH client(s) 206; thus considered DANE compliant or a DANE network element/component also. Note that the third-party server is not necessarily on the media delivery path 234 so it does not see the DASH media segments of media content representations being provided or presented to the DASH client 206. However, as it understands the DASH metrics and can produce SAND messages to DASH client(s) 206, for example to improve delivery, it can still be considered a DANE element.

In another embodiment, the congestion component 306 can be communicatively coupled to the media path interface component 212, the client-to-DANE interface component 216 or other components of the DANE component 204. The congestion component 306 can detect a congestion event related to the delivery of the streaming media content to the client device based on a network measurement or the set of metric and status messages via the client-to-DANE interface component 216. For example, signal strength via the media path 234, other communication links from the DASH client 206, other load information, bandwidth parameters, quality of service parameters, or other data from metrics and status messages, PED messages, or other communication data related to the network and communications thereat can be used by the congestion component 306 to determine whether or not a threshold or other criteria is satisfied for detecting a congestion event as it related to the streaming of media content via the media path 234 to the DASH client 206. In response to such a trigger, the modification of the streaming media content via the content adaptation component 216 can be implemented. As such, processes for assessing metrics and status messages, as well as data from PED messages and PER messages can be operated to determine what modification of the streaming content (e.g., structure, codecs, encoding, configurations, transcoding operations, media versions, segment boundaries, etc.) can be utilized to still meet the demands and capabilities of the DASH client 206 for QoE of the user.

Figure 4:
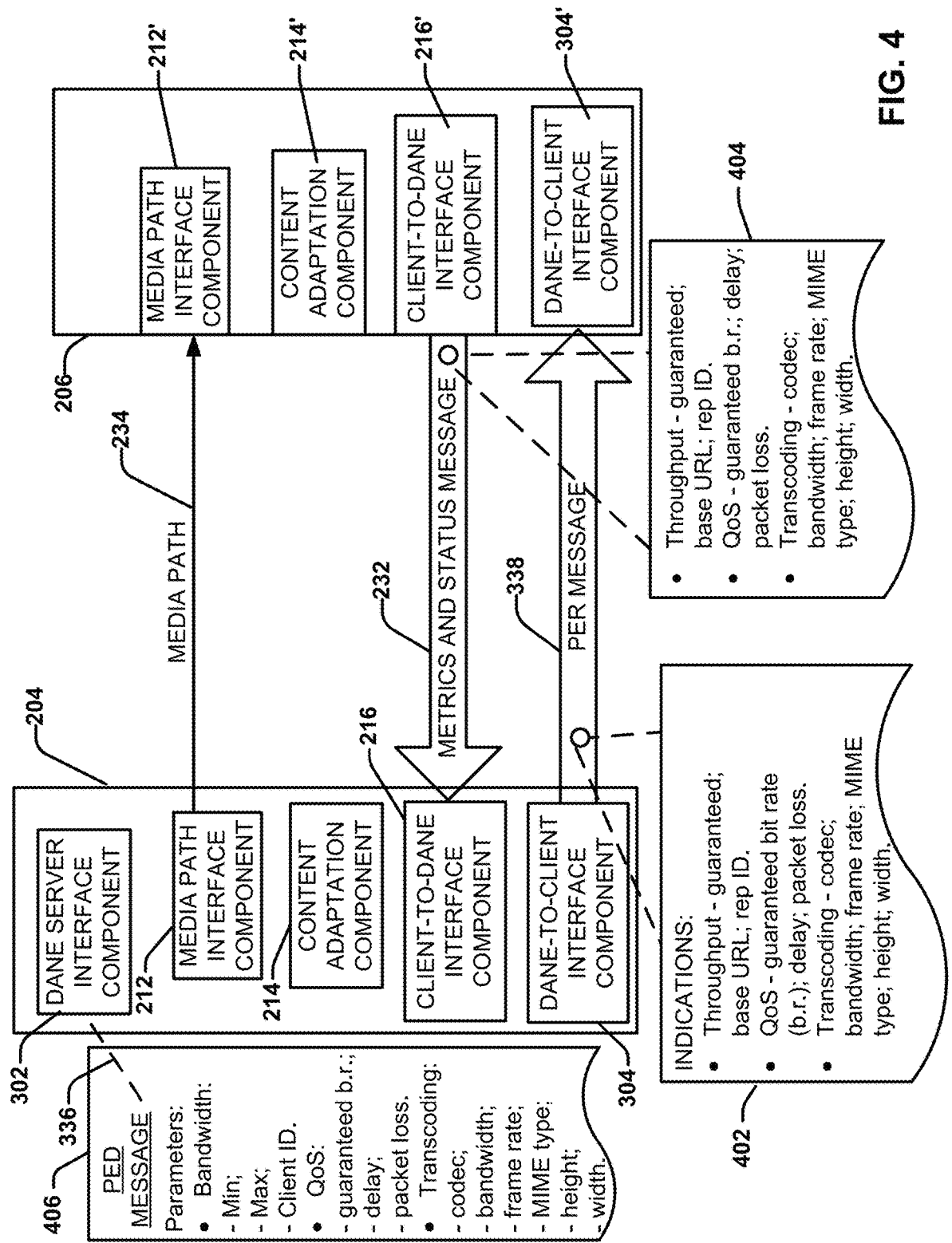
FIG. 4 illustrates block diagram at a client and servers for dynamic adaptive streaming over hypertext transfer protocol (HTTP) (DASH) in accordance with one or more aspects.

Referring now to FIG. 4, illustrates another embodiment of DASH network interfacing and protocols in accordance with various embodiments being described. Similar to the network environments described above, the DANE component 204 facilitates the delivery of streaming media content stored in a memory or data store via the media path 234. The DASH client similarly can receive and process streaming media content for rendering in a display or through a media player to a display (not shown) by the media path interface component 212'.

Additionally, the DASH client (e.g., a UE, a laptop or other mobile device) 206 can further comprise other similar components such as the content adaptation component 214', the client-to-DANE interface component 216', and the DANE-to-client interface component 304', for example. The content adaption component 214' can content receive, in response to providing the set of metric and status messages, a modification of the streaming media content or a media presentation of the streaming media content to smoothly render a modified streaming media content in a media sequence with the streaming media content at the DASH client 206. The content adaptation component 214' can further configure the status and metric messages 404 communicated via the interface link 232 based on the current network conditions, the capabilities of the DASH client 206 (e.g., resolution, frame rates, bit rates, frame size, frame height, frame width, bandwidth, processing power/speed, etc.) or the indication of parameters provided via the PER messages from the DANE component 204 or other DASH capable network components communicatively coupled to the network.

The modification can be implemented, or communicated, by the content adaptation component 214 or 214', for example. The modification can be in response to selections or data communicated via the metric and status messages 404 via link 232, the delivery of the streaming media content being changed (e.g., the bit rate, frame rate, band, or other parameter related to the interface link 234 operation or delivery), the streaming media content itself being changed (e.g., different versions), or a media presentation configuration of the streaming media content. The content adaptation component 214 or 214' can further operate to influence the modification of the streaming media content via the selections or configuring of the data for the metric and status message 404 as a response to the PER messages 402 via interface link 338.

Further, the client-to-DANE interface/component 216' is similar to the client-to-DANE interface 216 of the DANE component 206, and can provide (pre-process or transmit) the metric and status messages 232 concurrent with, during or at about the same time as the streaming media content is being received via the media path 234. The metric and status messages 232, for example, can include a change of at least one parameter related to rendering the streaming media content, which, for example, can be based on the PER messages 402 being received via link 338.

Likewise, the DANE-to-client interface/component 304' can control and receive the PER messages in order to parse, cipher, decode, or extract the data therein. The PER messages, as discussed above, can comprise an indication of a throughput, an indication of a quality of service, and an indication of a transcoding parameter, which provide a set of parameters available for adjustment to affect the modification by the set of metric and status messages via the client-to-DANE interface.

In one aspect, each of the interface paths or links can include particular kinds of data or protocols. The communication link or path 232 can be considered a client-to-DANE (C2D) Interface that carries metrics messages and status messages 404, which can be a uni-directional interface. The DANE to server interface can also be considered a DANE-to-DANE (D2D) Interface as the interface, bi-directional or uni-directional, link between any DANE component, server, router, or otherwise that carries the PED messages 406. Further, the communication link or path 338 can considered a DANE-to-client (D2C) Interface that carries the PER messages 402.

In another aspect, the PED message(s) 406 can include one or more quality of service parameters comprising a guaranteed bit rate, a maximum bit rate, a delay time, or a packet loss. The PED message(s) 406 can also include one or more bandwidth parameters comprising a minimum bandwidth, a maximum bandwidth, or a client identifier (ID) for identifying the parameters with one or more DANEs, particular media content tags, or other media content (e.g., metadata, overlays, audio, etc.). Additionally, the PED message(s) can include one or more transcoding parameters such as a codec parameter, a bandwidth, a frame rate, a Multipurpose Internet Mail Extensions (MIME) type, a height for vertical rendering of the streaming media content, or a width for horizontal rendering of the streaming media content, for example. The PED messages 406 can facilitate resource availability, identification or selections of media content configurations of segments available from the origin server 202, for example, in which different versions or the set of configurations (e.g., a bit rate, a frame rate, a resolution, a codec type or the like) for the particular streaming media content can be available for modification o of the streaming media content to the DASH client 206.

The metric and status messages 404 can include one or more throughput parameters, quality of service parameters, or transcoding parameters. The throughput parameters can comprise one or more indications of a guaranteed throughput, a base universal resource locator (URL) throughput information, or a representative identifier throughput information. The quality of service parameters can comprise one or more indications of a guaranteed bit rate, a maximum bit rate, a delay time, or a packet loss parameter. The transcoding parameters can include one or more indications of a codec parameter, a bandwidth, a frame rate, a Multipurpose Internet Mail Extensions (MIME) type, a height for vertical rendering of the streaming media content, and a width for horizontal rendering of the streaming media content.

The PER message 402 can comprise indications of availability, for example, to communicate options, selections or other indication for the DASH client 206 to request or response to, for example. The PER messages 402 thus can include similar data to the metrics and status message 232 with a throughput, a quality of service, or a transcoding parameter that enables a transcoding operation to be offloaded from the media origin server. The throughput parameters can comprise one or more indications of a guaranteed throughput, a base universal resource locator (URL) throughput information, or a representative identifier throughput information. The quality of service parameters can comprise one or more indications of a guaranteed bit rate, a maximum bit rate, a delay time, or a packet loss parameter. The transcoding parameters can include one or more indications of a codec parameter, a bandwidth, a frame rate, a Multipurpose Internet Mail Extensions (MIME) type, a height for vertical rendering of the streaming media content, and a width for horizontal rendering of the streaming media content.

FIGS. 5-6 illustrate representations one or more message lines or data for utilization of the throughput parameter in accordance with one or more embodiments. The throughput parameter, for example, can enable DASH clients 206 to have—in advance—knowledge of the throughput characteristics and the network guarantees along with this from the DANE components (e.g., 202, 204, or 310) to the DASH client 206. The status can be different for different base URL or different Representation IDs repID used, allowing to signal throughput characteristics dependent on the network delivering it. This can for example be used in case some QoS is provided on the access link between the DANE 204 and the DASH client 206 or if the data is cached in a local device or memory. This message can apply in the case the DANE 204 is located in a different device from the DASH client 206, and communicate with the DASH client 206 via a network, e.g. WiFi or cellular connection. The message expresses the throughput status of the network at the current time. The DASH client 206 can assume that this status persists until it is informed about a change of the status. Moreover, a DASH client 206 can also request or negotiate specific type of throughput from the network, e.g., in order to full-fill specific application requirements. Communication of the throughput parameters from the DASH client to a server or DANE 204 can be useful in that regard as well. Finally, exchange of throughput information between network entities (e.g., across DANEs 202 and 204, or 310) can also be beneficial in order to take specific actions such as dynamic transcoding to help optimize streaming to DASH clients in wireless networks, e.g., in response to a congestion event detection.

FIG. 7 illustrates example message information related to quality of service (QoS) information in accordance with one or more aspects. A DASH client 206 can take the available QoS information into consideration when requesting media content representations such that the consumed content bandwidth remains within the limits established by the signalled QoS information. As such, there is value in enabling signaling of QoS parameters to the DASH client in order to be used for adaptation purposes. Moreover, a DASH client 206 can also request or negotiate specific type of QoS from the network, e.g., in order to fulfil specific application requirements. Signaling of QoS parameters from the DASH client 206 to a server or DANE 204 can be useful in that regard as well. Finally, exchange of QoS information between network entities (e.g., across DANEs 202, 204, or 310) can also be beneficial in order to take specific actions such as dynamic transcoding to help optimize streaming to DASH clients in wireless networks, e.g., in response to a congestion event detection.

FIGS. 8-9 illustrate example message information related to a bandwidth information in accordance with one or more aspects. Minimum and maximum bandwidth information can be extracted from the MPD and shared with the service provider or operator to help facilitate the derivation of network QoS parameters at the DANE 204 or another network element, e.g., guaranteed bitrate (GBR) and maximum bitrate (MBR). The exact mapping of QoS parameters from minimum and maximum bandwidth is implementation specific and can depend on other factors such as service provider policy, application requirements and user subscription information. Minimum required bandwidth of the service, extracted from the MPD can be given by the sum of all MPD@minBandwidth of all media components simultaneously (not mutually exclusive) selectable by the DASH client plus HTTP/TCP/IP overhead and TCP messages for flow control. If this attribute is not present then minBandwidth is given by the su of MPD@bandwidth attributes of all media components of the available media presentation corresponding to representations or sub-representations with lowest bandwidth simultaneously (not mutually exclusive) selectable by the DASH client plus HTTP/TCP/IP overhead and TCP messages for flow control. If the client is expected to access multiple MPDs, then minBandwidth is calculated by summing up the minimum bandwidth values extracted from each MPD.

Maximum required bandwidth of the service, extracted from the MPD can be given by the sum of all MPD@maxBandwidth of all media components simultaneously (not mutually exclusive) selectable by the DASH client plus HTTP/TCP/IP overhead and TCP messages for flow control. If this attribute is not present then maxBandwidth is given by the sum of MPD@bandwidth attributes of all media components of the available media presentation corresponding to representations or sub-representations with highest bandwidth simultaneously selectable (not mutually exclusive) by the DASH client plus HTTP/TCP/IP overhead and TCP messages for flow control. If the client is expected to access multiple MPDs, then maxBandwidth is calculated by summing up the maximum bandwidth values extracted from each MPD.

FIGS. 10-11 illustrate example message information related to transcoding information in accordance with one or more aspects. If the origin server 202 has DASH content in different formats (e.g., audio, video, or container formats), then the DASH client 206, DANE 204 or third party edge server 310, after processing the MPD, can provide the origin server 202 with its supported codecs and formats, and request such content. In this case, the origin server 202 can transcode the contents in the requested formats. The main advantage for this signaling to be for the servers (e.g., DANE component 204) to make better (optimized) decisions and offer customized content targeted for the needs of the service provider and/or subscriber client (e.g., DASH client 206) capabilities. If the origin server 202 supports transcoding (formats or bitrates, latter a.k.a. transrating) then the DASH client 206, DANE 204 or third party edge server 310 also has an opportunity to take advantage of such signaling to request suitable codecs, container formats or bitrates, and a server (e.g., the DANE component 204, such as via the content adaptation component 216 or other components) can then offer (i.e., on-the-fly) to generate the suitable content to enable and/or optimize the streaming and operations for the transcoding or transrating. Moreover, this signaling can be useful when a given server (e.g., DANE component 204 or origin server 202) is overloaded in terms of its computational capabilities and needs to offload some of its encoding/transcoding to another network device/component.

FIG. 12 illustrates another example of message data between receiver side logic and sender side logic in accordance with one or more aspects described herein. In particular, transcoding/transrating request can be communicated with one or more indications of the transcoding parameters. The receive side logic or component can then process the request based on a determination of whether or not the transcoding requests are supported.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 13:
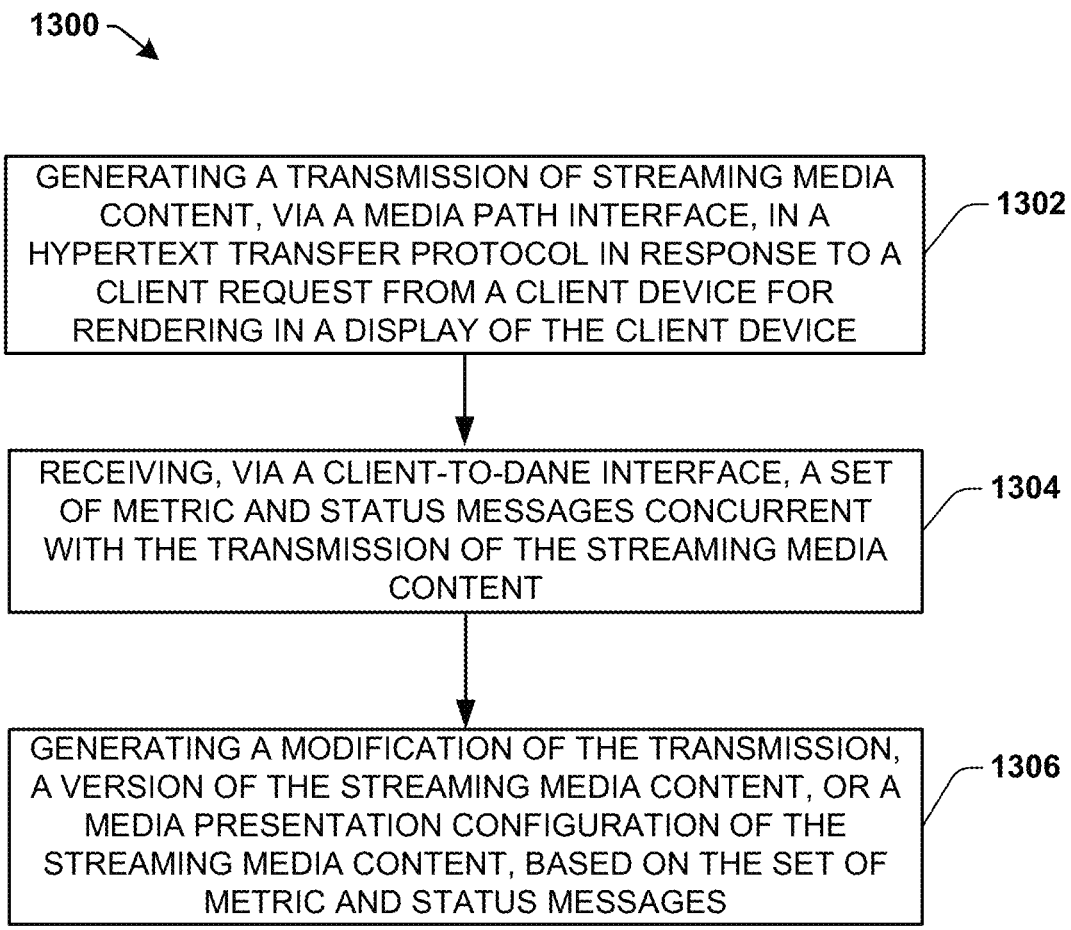
FIG. 13 illustrates an example process flow in accordance with one or more aspects described herein.

FIG. 13 illustrates an example process flow of a system for a DANE component of an evolved NodeB (eNB) comprising one or more processors configured to perform operations. The method 1300 initiates at 1302 with generating a transmission of streaming media content, via a media path interface (e.g., 234), in a hypertext transfer protocol in response to a client request from a client device (e.g., 206) for rendering in a display of the client device 206.

At 1304, the method can include receiving, via a client-to-DANE interface (e.g., 216 with link 232), a set of metric and status messages 404 concurrent with the transmission of the streaming media content.

At 1306, the method can include generating a modification of the transmission, a version of the streaming media content, or a media presentation configuration of the streaming media content, based on the set of metric and status messages 404.

Figure 14:
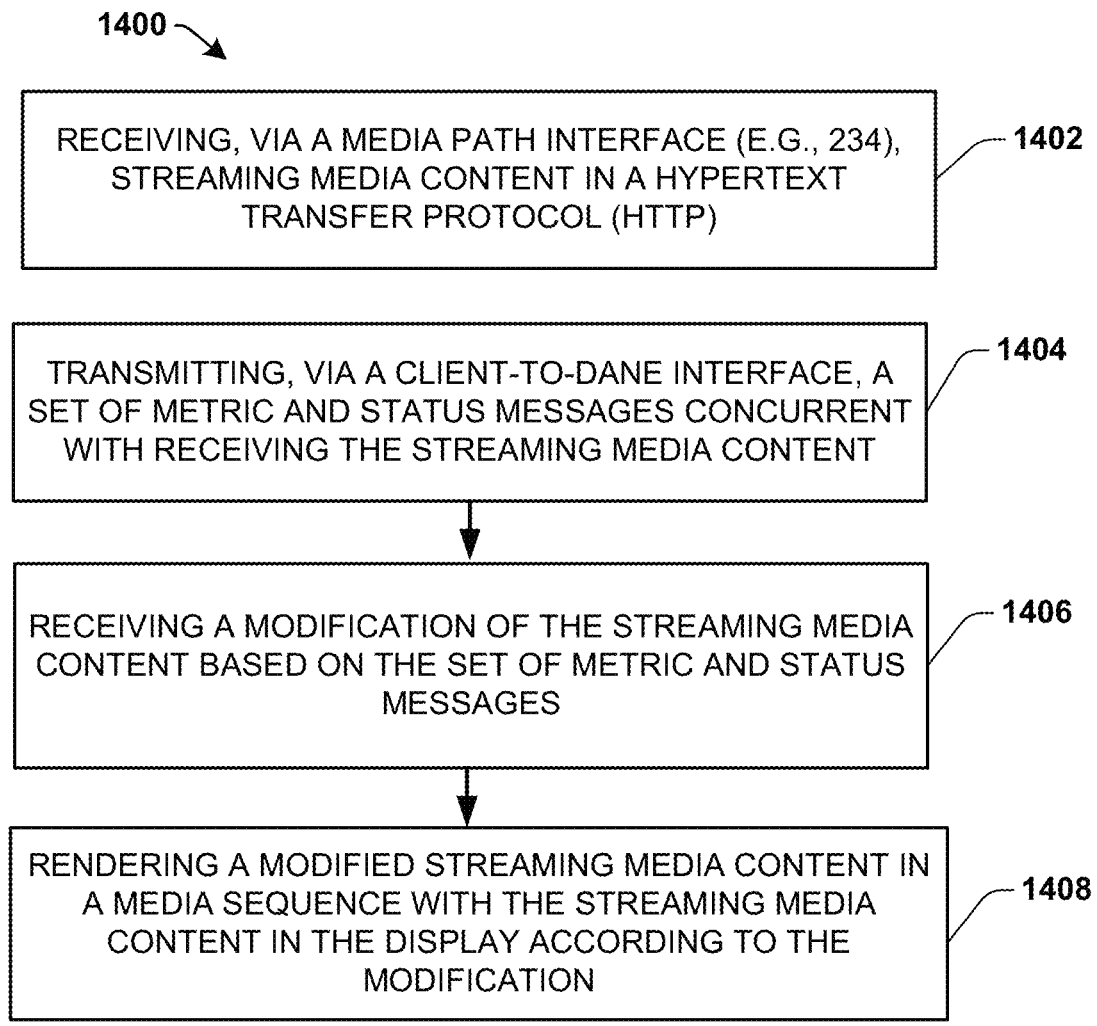
FIG. 14 illustrates another example process flow in accordance with one or more aspects described herein.

FIG. 14 illustrates an example of a process flow of a system for DANE of a user equipment (UE) comprising one or more processors configured to perform operations.

The method 1400 initiates at 1402 with receiving, via a media path interface (e.g., 234), streaming media content in a hypertext transfer protocol (HTTP).

At 1404, the method can include transmitting, via a client-to-DANE interface (e.g., 216 with link 232), a set of metric and status messages 404 concurrent with receiving the streaming media content. The metric and status messages can comprise a change of at least one parameter related to rendering the streaming media content in a display based on a parameter enhancing reception (PER) message.

At 1406, the method can include receiving a modification of the streaming media content based on the set of metric and status messages 404.

At 1408, the method can include rendering a modified streaming media content in a media sequence with the streaming media content in the display according to the modification.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 15:
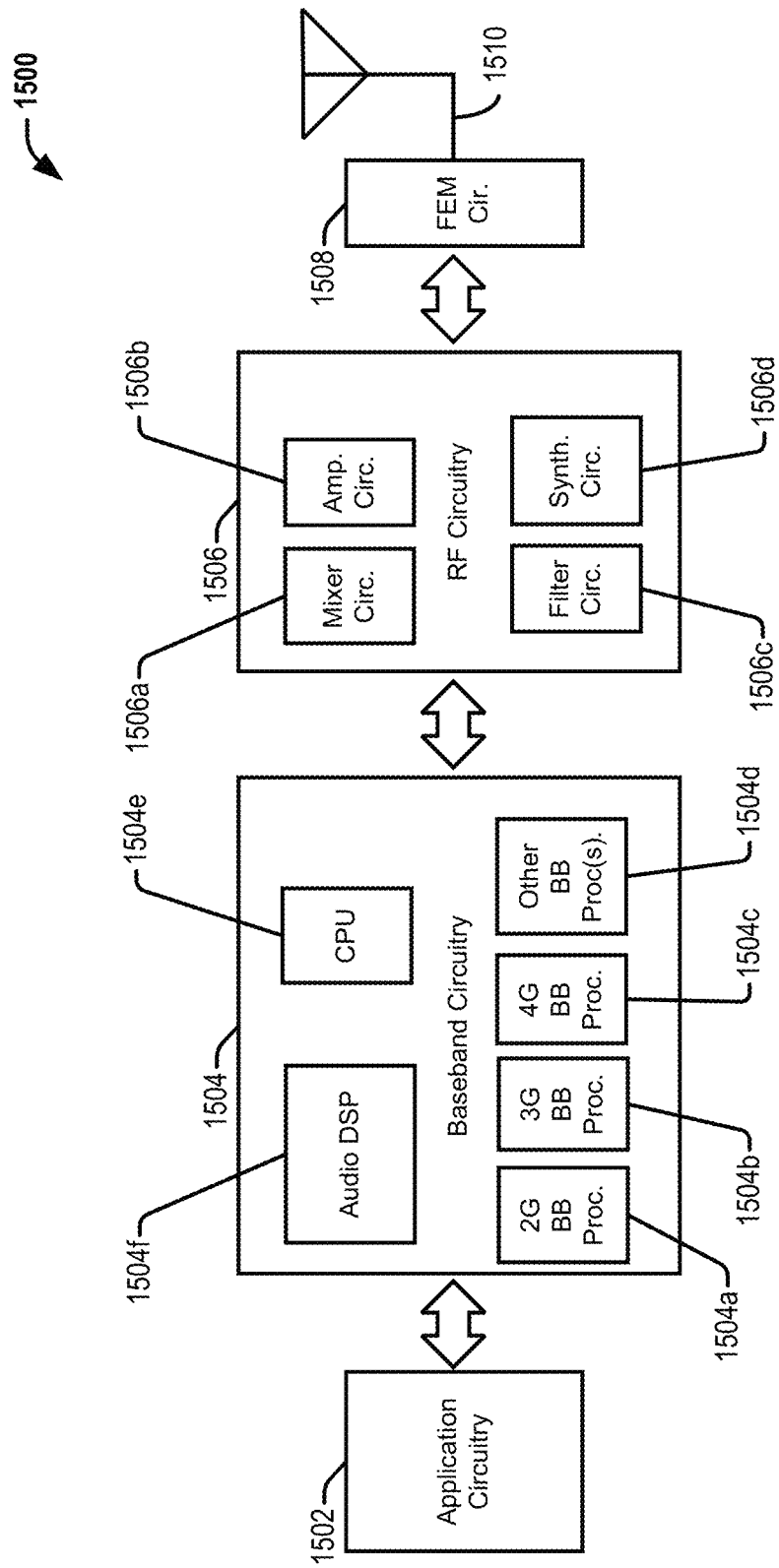
FIG. 15 is a block diagram illustrating an example UE or eNB useable in connection with various aspects described herein.

Embodiments described herein may be implemented into a system using any suitably configured hardware and/or software. FIG. 15 illustrates, for one embodiment, example components of network device such as a based station, eNB, or a User Equipment (UE) device 1500. In some embodiments, the UE device 1500 may include application circuitry 1502, baseband circuitry 1504, Radio Frequency (RF) circuitry 1506, front-end module (FEM) circuitry 1508 and one or more antennas 1510, coupled together at least as shown.

The application circuitry 1502 may include one or more application processors. For example, the application circuitry 1502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1504 may include circuitry such as, but not limited to, one or more single-core or multi-core processors. The baseband circuitry 1504 may include one or more baseband processors and/or control logic to process baseband signals received from a receive signal path of the RF circuitry 1506 and to generate baseband signals for a transmit signal path of the RF circuitry 1506. Baseband processing circuity 1504 may interface with the application circuitry 1502 for generation and processing of the baseband signals and for controlling operations of the RF circuitry 1506. For example, in some embodiments, the baseband circuitry 1504 may include a second generation (2G) baseband processor 1504a, third generation (3G) baseband processor 1504b, fourth generation (4G) baseband processor 1504c, and/or other baseband processor(s) 1504d for other existing generations, generations in development or to be developed in the future (e.g., fifth generation (5G), 6G, etc.). The baseband circuitry 1504 (e.g., one or more of baseband processors 1504a-d) may handle various radio control functions that enable communication with one or more radio networks via the RF circuitry 1506. The radio control functions may include, but are not limited to, signal modulation/demodulation, encoding/decoding, radio frequency shifting, etc. In some embodiments, modulation/demodulation circuitry of the baseband circuitry 1504 may include Fast-Fourier Transform (FFT), precoding, and/or constellation mapping/demapping functionality. In some embodiments, encoding/decoding circuitry of the baseband circuitry 1504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1504e of the baseband circuitry 1504 may be configured to run elements of the protocol stack for signaling of the PHY, MAC, RLC, PDCP and/or RRC layers. In some embodiments, the baseband circuitry may include one or more audio digital signal processor(s) (DSP) 1504f. The audio DSP(s) 1504f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1504 and the application circuitry 1502 may be implemented together such as, for example, on a system on a chip (SOC).

In some embodiments, the baseband circuitry 1504 may provide for communication compatible with one or more radio technologies. For example, in some embodiments, the baseband circuitry 1504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1504 is configured to support radio communications of more than one wireless protocol may be referred to as multi-mode baseband circuitry.

RF circuitry 1506 may enable communication with wireless networks using modulated electromagnetic radiation through a non-solid medium. In various embodiments, the RF circuitry 1506 may include switches, filters, amplifiers, etc. to facilitate the communication with the wireless network. RF circuitry 1506 may include a receive signal path which may include circuitry to down-convert RF signals received from the FEM circuitry 1508 and provide baseband signals to the baseband circuitry 1504. RF circuitry 1506 may also include a transmit signal path which may include circuitry to up-convert baseband signals provided by the baseband circuitry 1504 and provide RF output signals to the FEM circuitry 1508 for transmission.

In some embodiments, the RF circuitry 1506 may include a receive signal path and a transmit signal path. The receive signal path of the RF circuitry 1506 may include mixer circuitry 1506a, amplifier circuitry 1506b and filter circuitry 1506c. The transmit signal path of the RF circuitry 1506 may include filter circuitry 1506c and mixer circuitry 1506a. RF circuitry 1506 may also include synthesizer circuitry 1506d for synthesizing a frequency for use by the mixer circuitry 1506a of the receive signal path and the transmit signal path. In some embodiments, the mixer circuitry 1506a of the receive signal path may be configured to down-convert RF signals received from the FEM circuitry 1508 based on the synthesized frequency provided by synthesizer circuitry 1506d. The amplifier circuitry 1506b may be configured to amplify the down-converted signals and the filter circuitry 1506c may be a low-pass filter (LPF) or band-pass filter (BPF) configured to remove unwanted signals from the down-converted signals to generate output baseband signals. Output baseband signals may be provided to the baseband circuitry 1504 for further processing. In some embodiments, the output baseband signals may be zero-frequency baseband signals, although this is not a requirement. In some embodiments, mixer circuitry 1506a of the receive signal path may comprise passive mixers, although the scope of the embodiments is not limited in this respect.

In some embodiments, the mixer circuitry 1506a of the transmit signal path may be configured to up-convert input baseband signals based on the synthesized frequency provided by the synthesizer circuitry 1506d to generate RF output signals for the FEM circuitry 1508. The baseband signals may be provided by the baseband circuitry 1504 and may be filtered by filter circuitry 1506c. The filter circuitry 1506c may include a low-pass filter (LPF), although the scope of the embodiments is not limited in this respect.

In some embodiments, the mixer circuitry 1506a of the receive signal path and the mixer circuitry 1506a of the transmit signal path may include two or more mixers and may be arranged for quadrature downconversion and/or upconversion respectively. In some embodiments, the mixer circuitry 1506a of the receive signal path and the mixer circuitry 1506a of the transmit signal path may include two or more mixers and may be arranged for image rejection (e.g., Hartley image rejection). In some embodiments, the mixer circuitry 1506a of the receive signal path and the mixer circuitry 1506a may be arranged for direct downconversion and/or direct upconversion, respectively. In some embodiments, the mixer circuitry 1506a of the receive signal path and the mixer circuitry 1506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1506 may include analog-to-digital converter (ADC) and digital-to-analog converter (DAC) circuitry and the baseband circuitry 1504 may include a digital baseband interface to communicate with the RF circuitry 1506.

In some dual-mode embodiments, a separate radio IC circuitry may be provided for processing signals for each spectrum, although the scope of the embodiments is not limited in this respect.

In some embodiments, the synthesizer circuitry 1506d may be a fractional-N synthesizer or a fractional N/N+1 synthesizer, although the scope of the embodiments is not limited in this respect as other types of frequency synthesizers may be suitable. For example, synthesizer circuitry 1506d may be a delta-sigma synthesizer, a frequency multiplier, or a synthesizer comprising a phase-locked loop with a frequency divider.

The synthesizer circuitry 1506d may be configured to synthesize an output frequency for use by the mixer circuitry 1506a of the RF circuitry 1506 based on a frequency input and a divider control input. In some embodiments, the synthesizer circuitry 1506d may be a fractional N/N+1 synthesizer.

In some embodiments, frequency input may be provided by a voltage controlled oscillator (VCO), although that is not a requirement. Divider control input may be provided by either the baseband circuitry 1504 or the applications processor 1502 depending on the desired output frequency. In some embodiments, a divider control input (e.g., N) may be determined from a look-up table based on a channel indicated by the applications processor 1502.

Synthesizer circuitry 1506d of the RF circuitry 1506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1506*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 1506 may include an IQ/polar converter.

FEM circuitry 1508 may include a receive signal path which may include circuitry configured to operate on RF signals received from one or more antennas 1510, amplify the received signals and provide the amplified versions of the received signals to the RF circuitry 1506 for further processing. FEM circuitry 1508 may also include a transmit signal path which may include circuitry configured to amplify signals for transmission provided by the RF circuitry 1506 for transmission by one or more of the one or more antennas 1510.

In some embodiments, the FEM circuitry 1508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1506). The transmit signal path of the FEM circuitry 1508 may include a power amplifier (PA) to amplify input RF signals (e.g., provided by RF circuitry 1506), and one or more filters to generate RF signals for subsequent transmission (e.g., by one or more of the one or more antennas 1510.

In some embodiments, the UE device 1500 may include additional elements such as, for example, memory/storage, display, camera, sensor, and/or input/output (I/O) interface.

Figure 16:
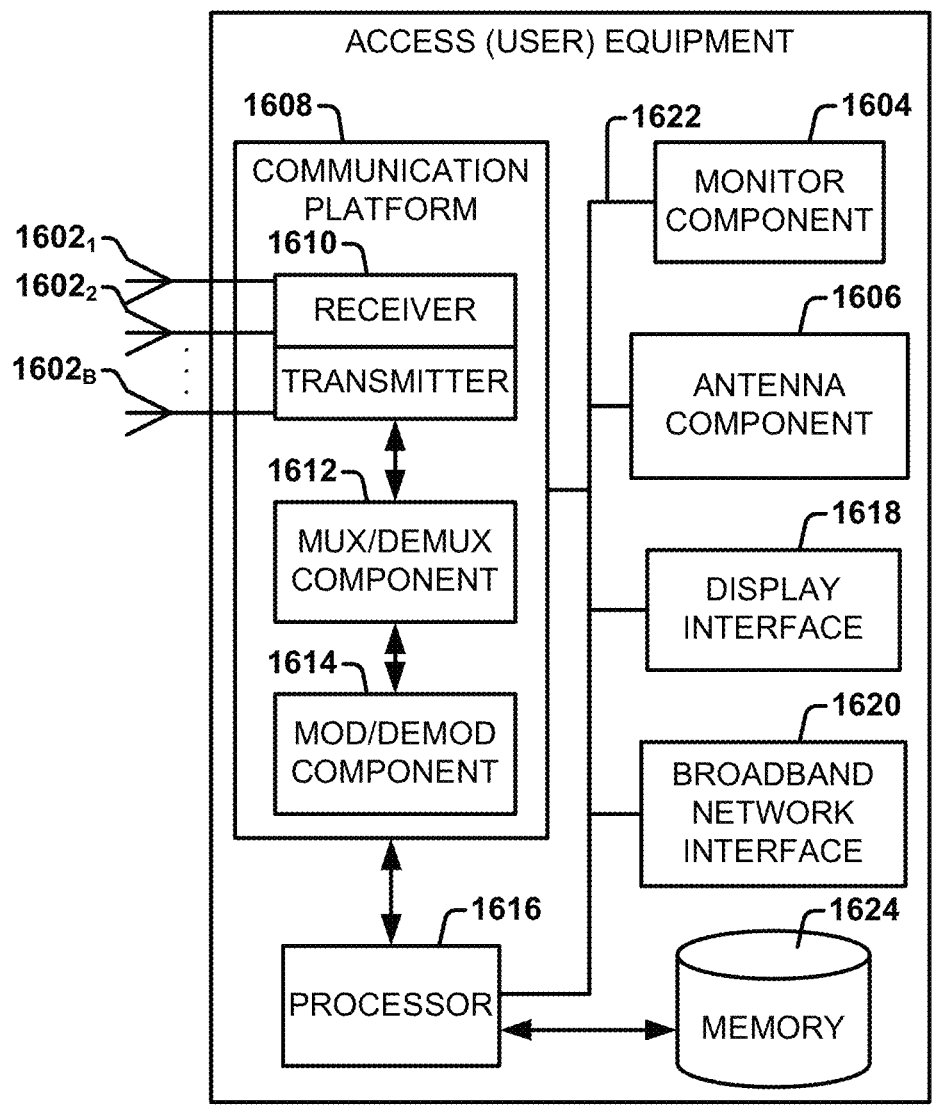
FIG. 16 is a block diagram of another example of UE, eNB, or other network device that facilitates bearer splitting according to various aspects described herein.

To provide further context for various aspects of the disclosed subject matter, FIG. 16 illustrates a block diagram of an embodiment of access (or user) equipment related to access of a network (e.g., network device, base station, wireless access point, femtocell access point, and so forth) that can enable and/or exploit features or aspects disclosed herein. For example the communication platform 1608 can include any one of the components or devices discussed in accordance with one or more aspects/embodiments described herein.

Access (or user) equipment (e.g., eNB, network entity, or the like), UE or software related to access of a network can receive and transmit signal(s) from and to wireless devices, wireless ports, wireless routers, etc. through segments 1602₁-1602_B (B is a positive integer). Segments 1602₁-1602_B can be internal and/or external to access equipment and/or software related to access of a network, and can be controlled by a monitor component 1604 and an antenna component 1606. Monitor component 1604 and antenna component 1606 can couple to communication platform 1608, which can include electronic components and associated circuitry that provide for processing and manipulation of received signal(s) and other signal(s) to be transmitted.

In an aspect, communication platform 1608 includes a receiver/transmitter 1610 that can convert analog signals to digital signals upon reception of the analog signals, and can convert digital signals to analog signals upon transmission. In addition, receiver/transmitter 1610 can divide a single data stream into multiple, parallel data streams, or perform the reciprocal operation. Coupled to receiver/transmitter 1610 can be a multiplexer/demultiplexer 1612 that can facilitate manipulation of signals in time and frequency space. Multiplexer/demultiplexer 1612 can multiplex information (data/traffic and control/signaling) according to various multiplexing schemes such as time division multiplexing, frequency division multiplexing, orthogonal frequency division multiplexing, code division multiplexing, space division multiplexing. In addition, multiplexer/demultiplexer component 1612 can scramble and spread information (e.g., codes, according to substantially any code known in the art, such as Hadamard-Walsh codes, Baker codes, Kasami codes, polyphase codes, and so forth).

A modulator/demodulator 1614 is also a part of communication platform 1608, and can modulate information according to multiple modulation techniques, such as frequency modulation, amplitude modulation (e.g., M-ary quadrature amplitude modulation, with M a positive integer); phase-shift keying; and so forth).

Access equipment and/or software related to access of a network also includes a processor 1616 configured to confer, at least in part, functionality to substantially any electronic component in access equipment and/or software. In particular, processor 1616 can facilitate configuration of access equipment and/or software through, for example, monitor component 1604, antenna component 1606, and one or more components therein. Additionally, access equipment and/or software can include display interface 1618, which can display functions that control functionality of access equipment and/or software or reveal operation conditions thereof. In addition, display interface 1618 can include a screen to convey information to an end user. In an aspect, display interface 1618 can be a liquid crystal display, a plasma panel, a monolithic thin-film based electrochromic display, and so on. Moreover, display interface 1618 can include a component (e.g., speaker) that facilitates communication of aural indicia, which can also be employed in connection with messages that convey operational instructions to an end user. Display interface 1618 can also facilitate data entry (e.g., through a linked keypad or through touch gestures), which can cause access equipment and/or software to receive external commands (e.g., restart operation).

Broadband network interface 1620 facilitates connection of access equipment and/or software to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1620 can be internal or external to access equipment and/or software and can utilize display interface 1618 for end-user interaction and status information delivery.

Processor 1616 can be functionally connected to communication platform 1608 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1616 can be functionally connected, through data, system, or an address bus 1622, to display interface 1618 and broadband network interface 1620, to confer, at least in part, functionality to each of such components.

In access equipment and/or software memory 1624 can retain location and/or coverage area (e.g., macro sector, identifier(s)) access list(s) that authorize access to wireless coverage through access equipment and/or software sector intelligence that can include ranking of coverage areas in the wireless environment of access equipment and/or software, radio link quality and strength associated therewith, or the like. Memory 1624 also can store data structures, code instructions and program modules, system or device information, code sequences for scrambling, spreading and pilot transmission, access point configuration, and so on. Processor 1616 can be coupled (e.g., through a memory bus), to memory 1624 in order to store and retrieve information used to operate and/or confer functionality to the components, platform, and interface that reside within access equipment and/or software.

The access (user) equipment, the system 1500, other system, network component or device herein can be incorporated into or otherwise part of, an eNB, a UE, a DASH client, a DANE, or some other type of electronic device in accordance with various embodiments. Specifically, the electronic device or components or interfaces described herein can be logic and/or circuitry that can be at least partially implemented in one or more of hardware, software, and/or firmware. In embodiments, the electronic device logic can include radio transmit logic and receive logic (e.g., 1610) coupled to control logic (e.g., processor 1616). In embodiments, the transmit and/or receive logic can be elements or modules of transceiver logic 1610. The electronic device and/or the components, circuitry or interfaces of such electronic device can be configured to perform operations similar to those described elsewhere in this disclosure.

In embodiments where the electronic device is a DANE, or is incorporated into or otherwise part of a DANE, the receive logic can be to receive, from a DASH client, a metric message or status message. The transmit logic can be to transmit a parameters enhancing deliver (PED) message to another DANE. The transmit logic can be further to transmit a parameters enhancing reception (PER) message to the DASH client.

In embodiments where the electronic device is a DASH client, the transmit logic can be to transmit, to a DASH assisted network element (DANE), a metric message or a status message. The receive logic can be to receive, from the DANE, a parameters enhancing reception (PER) message. Transmit and receive logic, for example, could also operate to transmit or receive PED messages as described herein also.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a network device for a dynamic adaptive streaming over hypertext transfer protocol (DASH) assisting network element (DANE) of a DANE server, comprising: a memory storing executable instructions that execute one or more computer executable components; and a processor configured to execute the executable instructions for the one or more executable components comprising: a media path interface component configured to communicatively couple to a media origin server and a client device, and deliver streaming media content to the client device from the media origin server based on a set of parameters; a client-to-DANE interface component configured to receive a set of metric and status messages from the client device concurrent with a delivery of the streaming media content via the media path interface component; and a content adaptation component, communicatively coupled to the media path interface component and the client-to-DANE interface component, configured to generate a modification including a transcoding or a transrating of a media presentation of a sequence of segments, the delivery of the streaming media content, or the streaming media content during the delivery to the client device via the media path interface component based on the set of metric and status messages received via the client-to-DANE interface component.

Example 2 includes the subject matter of Example 1, including or omitting optional elements, wherein the executable components further comprise: a DANE server interface component configured to transmit, or receive, one or more parameter enhancing delivery (PED) messages to or from the media origin server, wherein the PED messages comprise the set of parameters that facilitate the media presentation from the media origin server to the client device via the media path interface component to provide the delivery of the streaming media content based on the set of parameters before the modification.

Example 3 includes the subject matter of any one of Examples 1-2, including or omitting optional elements, wherein the set of parameters comprise one or more quality of service parameters, one or more bandwidth parameters, and one or more transcoding or transrating parameters for transcoding or transrating operations to be offloaded from the media origin server to the DANE server.

Example 4 includes the subject matter of any one of Examples 1-3, including or omitting optional elements, wherein the one or more quality of service parameters comprise a guaranteed bit rate, a maximum bit rate, a delay time, and a packet loss; wherein the one or more bandwidth parameters comprise a minimum bandwidth, a maximum bandwidth, and a client identifier (ID); and wherein the one or more transcoding parameters comprise a codec parameter, a bandwidth, a frame rate, a Multipurpose Internet Mail Extensions (MIME) type, a height for vertical rendering of the streaming media content, and a width for horizontal rendering of the streaming media content.

Example 5 includes the subject matter of any one of Examples 1-4, including or omitting optional elements, further comprising: a DANE-to-client interface component configured to transmit parameter enhancing reception (PER) messages to the client device that comprise an indication of a throughput, an indication of a quality of service, and an indication of a transcoding parameter that enables a transcoding operation to be offloaded from the media origin server.

Example 6 includes the subject matter of any one of Examples 1-5, including or omitting optional elements, wherein the client device comprises a user equipment (UE) that communicates to the DANE server via the client-to-DANE interface component with the set of metric and status messages concurrent with the delivery of the streaming media content via the media path interface component to effectuate the modification in a rendering of the streaming media content in a display.

Example 7 includes the subject matter of any one of Examples 1-6, including or omitting optional elements, wherein the set of metric and status messages comprises a set of throughput parameters, a set of quality of service parameters, and a set of transcoding parameters that enable transcoding operations to be offloaded from the media origin server.

Example 8 includes the subject matter of any one of Examples 1-7, including or omitting optional elements, wherein the set of throughput parameters comprise one or more indications of a guaranteed throughput, a base universal resource locator (URL) throughput information, and a representative identifier throughput information; wherein the set of quality of service parameters comprise one or more indications of a guaranteed bit rate, a maximum bit rate, a delay time, and a packet loss; wherein the set of transcoding parameters comprise one or more indications of a codec parameter, a bandwidth, a frame rate, a Multipurpose Internet Mail Extensions (MIME) type, a height for vertical rendering of the streaming media content, and a width for horizontal rendering of the streaming media content.

Example 9 includes the subject matter of any one of Examples 1-8, including or omitting optional elements, further comprising: a congestion component configured to detect a congestion event related to the delivery of the streaming media content to the client device based on a network measurement or the set of metric and status messages via the client-to-DANE interface component, and trigger the modification of the streaming media content via the content adaptation component.

Example 10 includes the subject matter of any one of Examples 1-9, including or omitting optional elements, wherein the content adaptation component is further configured to generate the modification of the media presentation of the sequence of segments during the delivery of the streaming media content to the client device by changing versions of the streaming media content stored in the memory based on the set of metric and status messages from the client device and the set of parameters on one or more PED messages that relate to a network congestion from the media origin server via a DANE server interface component.

Example 11 includes the subject matter of any one of Examples 1-10, including or omitting optional elements, wherein the versions comprise different configurations of the streaming media content based on at least one of a bit rate, a frame rate, a resolution, or a codec type.

Example 12 includes the subject matter of any one of Examples 1-11, including or omitting optional elements, wherein the DANE server comprises a proxy server that is communicatively coupled to the client device at a final network hop via the client-to-DANE interface component and a DANE-to-client interface component, wherein the DANE-to-client interface component is configured to transmit parameters enhancing reception (PER) messages to the client device that comprise an indication of a throughput, an indication of a quality of service, and a set of transcoding parameters that enable transcoding operations to be offloaded from the media origin server.

Example 13 is a system for a dynamic adaptive streaming over hypertext transfer protocol (DASH) assisting network element (DANE) of an evolved NodeB (eNB), comprising: a media path interface configured to receive streaming media content and provide a delivery of the streaming media content via a hypertext transfer protocol (HTTP) channel in response to a client request for a client device to render in a display; a client-to-DANE interface configured to receive a set of metric and status messages concurrent with or during the delivery of the streaming media content; a memory storing executable instructions that execute one or more computer executable components; and a processor configured to execute the executable instructions for the one or more executable components, comprising: a content adaptation component configured to generate a modification including a transcoding or a transrating of at least one of: the delivery of the streaming media content, the streaming media content, or a media presentation configuration of the streaming media content, based on the set of metric and status messages for the client device to render in the display.

Example 14 includes the subject matter of Example 13, wherein the set of metric and status messages comprise a media configuration requests, a network measurement, or a client device parameter; wherein the media configuration requests comprise a client device application or user preference request related to a media player of the client device including a throughput request or a quality of service request; wherein the network measurement comprises a quality of service indication including a load congestion, a buffer rate, a received signal strength indication (RSSI), a network link quality, a delay, a backhaul rate, a bit rate, or a packet loss; and wherein the client device parameter comprises a device capability parameter, a traffic requirement, a mobility parameter or a transcoding parameter that enables a transcoding operation based on an indication of a codec parameter, a bandwidth, a frame rate, a frame width, a frame height, or a Multipurpose Internet Mail Extensions (MIME) type.

Example 15 includes the subject matter of any one of Examples 13-14, including or omitting optional elements, further comprising: a DANE server interface configured to communicate one or more parameter enhancing delivery (PED) messages that facilitate the delivery, the streaming media content, or the media presentation configuration of the streaming media content, wherein the PED messages comprise parameters including a quality of service parameter, a bandwidth parameter, and a transcoding parameter for a transcoding operation to be offloaded from a media originating server; and a DANE-to-client interface configured to transmit one or more parameter enhancing reception (PER) messages to the client device that comprise an indication of a throughput, an indication of the quality of service parameter, and an indication of the transcoding parameter, which enables the client device to affect the modification via the set of metric and status messages by the client-to-DANE interface based on the one or more PER messages.

Example 16 includes the subject matter of any one of Examples 13-15, including or omitting optional elements, wherein the content adaptation component is further configured to generate the modification of the media presentation configuration of a sequence of media segments during the delivery of the streaming media content to the client device by changing a version or a set of configurations of the streaming media content based on the set of metric and status messages via the client-to-DANE interface and the one or more PED messages via the DANE server interface.

Example 17 includes the subject matter of any one of Examples 13-16, including or omitting optional elements, wherein the version or the set of configurations comprises at least one of: a bit rate, a frame rate, a resolution, or a codec type, which is different from the streaming media content from the delivery.

Example 18 includes the subject matter of any one of Examples 13-17, including or omitting optional elements, wherein the eNB comprises a DANE server communicatively coupled to the client device as a final network hop via the client-to-DANE interface and the DANE-to-client interface, wherein the client-to-DANE interface and the DANE-to-client interface comprise a unidirectional interface, and the media path interface comprises a bi-directional interface.

Example 19 is a system for a dynamic adaptive streaming over hypertext transfer protocol (DASH) assisting network element (DANE) of a user equipment (UE) comprising: a media path interface configured to provide a client request and receive streaming media content in a hypertext transfer protocol (HTTP) in response to the client request; a client-to-DANE interface configured to provide a set of metric and status messages concurrent with receiving the streaming media content, wherein the set of metric and status messages comprises a change of at least one parameter related to rendering the streaming media content in a display; a memory storing executable instructions that execute one or more computer executable components; and a processor configured to execute the executable instructions for the one or more executable components, comprising: a content adaptation component configured to receive, in response to providing the set of metric and status messages, a modification including a transcoding or a transrating of the streaming media content or a media presentation of the streaming media content to smoothly render a modified streaming media content in a media sequence with the streaming media content in the display.

Example 20 includes the subject matter of Examples 19, including or omitting optional elements, further comprising: a DANE-to-client interface configured to receive one or more parameter enhancing reception (PER) messages that comprise an indication of a throughput, an indication of a quality of service, and an indication of a transcoding parameter, which provide a set of parameters available for adjustment to affect the modification by the set of metric and status messages via the client-to-DANE interface.

Example 21 is a computer-readable media comprising executable instructions that, in response to execution, cause a system for a dynamic adaptive streaming over hypertext transfer protocol (DASH) assisting network element (DANE) of an evolved NodeB (eNB) comprising one or more processors configured to perform operations comprising: generating a transmission of streaming media content, via a media path interface, in a hypertext transfer protocol in response to a client request from a client device for rendering in a display of the client device; receiving, via a client-to-DANE interface, a set of metric and status messages concurrent with the transmission of the streaming media content; generating a modification of the transmission, a version of the streaming media content, or a media presentation configuration of the streaming media content, based on the set of metric and status messages.

Example 22 includes the subject matter of Example 21, including or omitting optional elements, wherein the operations further comprise: receiving, via the media path interface, the streaming media content from a media origin server based on one or more parameter enhancing delivery (PED) messages being communicated via a DANE server interface, wherein the PED messages comprise one or more quality of service parameters, one or more bandwidth parameters, and one or more transcoding parameters for transcoding operations to be offloaded from the media origin server to the eNB; and transmitting, via a DANE-to-client interface, one or more parameter enhancing reception (PER) messages to the client device that comprise an indication of a throughput, an indication of a quality of service, and an indication of a transcoding parameter, which enables the client device to affect the modification via the set of metric and status messages via the client-to-DANE interface based on the one or more PER messages.

Example 23 includes the subject matter of any one of Examples 21-22, including or omitting optional elements, wherein the one or more quality of service parameters comprise one or more indications of a guaranteed bit rate, a maximum bit rate, a delay time, and a packet loss; the one or more bandwidth parameters comprise a minimum bandwidth, a maximum bandwidth, and a client identifier (ID); and the one or more transcoding parameters comprise a codec parameter, a bandwidth, a frame rate, a Multipurpose Internet Mail Extensions (MIME) type, a frame height, and a frame width for rendering of the streaming media content at the display.

Example 24 is a computer-readable media comprising executable instructions that, in response to execution, cause a system for a dynamic adaptive streaming over hypertext transfer protocol (DASH) assisting network element (DANE) of a user equipment (UE) comprising one or more processors configured to perform operations comprising: receiving, via a media path interface, streaming media content in a hypertext transfer protocol (HTTP); transmitting, via a client-to-DANE interface, a set of metric and status messages concurrent with receiving the streaming media content, wherein the set of metric and status messages comprises a change of at least one parameter related to rendering the streaming media content in a display based on a parameter enhancing reception (PER) message; receiving a modification of the streaming media content based on the set of metric and status messages; and rendering a modified streaming media content in a media sequence with the streaming media content in the display according to the modification.

Example 25 includes the subject matter of Examples 24, including or omitting optional elements, wherein the operations further comprise: receiving, DANE-to-client interface, the PER messages comprising an indication of a throughput, an indication of a quality of service, and an indication of a transcoding parameter, which provide a set of parameters available for adjustment to affect the modification by the set of metric and status messages via the client-to-DANE interface.

Example 26 is a system comprising: means for generating a transmission of streaming media content, via a media path interface, in a hypertext transfer protocol in response to a client request from a client device for rendering in a display of the client device; means for receiving, via a client-to-DANE interface, a set of metric and status messages concurrent with the transmission of the streaming media content; and means for generating a modification of the transmission, a version of the streaming media content, or a media presentation configuration of the streaming media content, based on the set of metric and status messages.

Example 27 includes the subject matter of Example 26, including or omitting optional elements, further comprising: means for receiving, via the media path interface, the streaming media content from a media origin server based on one or more parameter enhancing delivery (PED) messages being communicated via a DANE server interface, wherein the PED messages comprise one or more quality of service parameters, one or more bandwidth parameters, and one or more transcoding parameters for transcoding operations to be offloaded from the media origin server to the eNB; and means for transmitting, via a DANE-to-client interface, one or more parameter enhancing reception (PER) messages to the client device that comprise an indication of a throughput, an indication of a quality of service, and an indication of a transcoding parameter, which enables the client device to affect the modification via the set of metric and status messages via the client-to-DANE interface based on the one or more PER messages.

Example 28 includes the subject matter of any one of Examples 26-27, including or omitting optional elements, wherein the one or more quality of service parameters comprise one or more indications of a guaranteed bit rate, a maximum bit rate, a delay time, and a packet loss; the one or more bandwidth parameters comprise a minimum bandwidth, a maximum bandwidth, and a client identifier (ID); and the one or more transcoding parameters comprise a codec parameter, a bandwidth, a frame rate, a Multipurpose Internet Mail Extensions (MIME) type, a frame height, and a frame width for rendering of the streaming media content at the display.

Example 29 is a system comprising: means for receiving, via a media path interface, streaming media content in a hypertext transfer protocol (HTTP); means for transmitting, via a client-to-DANE interface, a set of metric and status messages concurrent with receiving the streaming media content, wherein the set of metric and status messages comprises a change of at least one parameter related to rendering the streaming media content in a display based on a parameter enhancing reception (PER) message; means for receiving a modification of the streaming media content based on the set of metric and status messages; and means for rendering a modified streaming media content in a media sequence with the streaming media content in the display according to the modification.

Example 30 includes the subject matter of Example 29, including or omitting optional elements, further comprising: means for receiving, DANE-to-client interface, the PER messages comprising an indication of a throughput, an indication of a quality of service, and an indication of a transcoding parameter, which provide a set of parameters available for adjustment to affect the modification by the set of metric and status messages via the client-to-DANE interface.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDML, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A network device for a dynamic adaptive streaming over hypertext transfer protocol (DASH) assisting network element (DANE) of a DANE server, comprising
a memory storing executable instructions that execute one or more computer executable components; and
a processor configured to execute the executable instructions for the one or more executable components comprising:
a media path interface component configured to communicatively couple to a media origin server and a client device, and deliver streaming media content to the client device from the media origin server based on a set of parameters;
a client-to-DANE interface component configured to receive a set of metric and status messages from the client device concurrent with a delivery of the streaming media content via the media path interface component; and
a content adaptation component, communicatively coupled to the media path interface component and the client-to-DANE interface component, configured to generate a modification including a transcoding or a transrating of a media presentation of a sequence of segments, the delivery of the streaming media content, or the streaming media content during the delivery to the client device via the media path interface component based on the set of metric and status messages received via the client-to-DANE interface component.

2. The network device of claim 1, wherein the executable components further comprise:
a DANE server interface component configured to transmit, or receive, one or more parameter enhancing delivery (PED) messages to or from the media origin server, wherein the PED messages comprise the set of parameters that facilitate the media presentation from the media origin server to the client device via the media path interface component to provide the delivery of the streaming media content based on the set of parameters before the modification.

3. The network device of claim 2, wherein the set of parameters comprise one or more quality of service parameters, one or more bandwidth parameters, and one or more transcoding or transrating parameters for transcoding or transrating operations to be offloaded from the media origin server to the DANE server.

4. The network device of claim 3, wherein the one or more quality of service parameters comprise a guaranteed bit rate, a maximum bit rate, a delay time, and a packet loss; wherein the one or more bandwidth parameters comprise a minimum bandwidth, a maximum bandwidth, and a client identifier (ID); and wherein the one or more transcoding parameters comprise a codec parameter, a bandwidth, a frame rate, a Multipurpose Internet Mail Extensions (MIME) type, a height for vertical rendering of the streaming media content, and a width for horizontal rendering of the streaming media content.

5. The network device of claim 1, further comprising:
a DANE-to-client interface component configured to transmit parameter enhancing reception (PER) messages to the client device that comprise an indication of a throughput, an indication of a quality of service, and an indication of a transcoding parameter that enables a transcoding operation to be offloaded from the media origin server.

6. The network device of claim 1, wherein the client device comprises a user equipment (UE) that communicates to the DANE server via the client-to-DANE interface component with the set of metric and status messages concurrent with the delivery of the streaming media content via the media path interface component to effectuate the modification in a rendering of the streaming media content in a display.

7. The network device of claim 1, wherein the set of metric and status messages comprises a set of throughput parameters, a set of quality of service parameters, and a set of transcoding parameters that enable transcoding operations to be offloaded from the media origin server.

8. The network device of claim 7, wherein the set of throughput parameters comprise one or more indications of a guaranteed throughput, a base universal resource locator (URL) throughput information, and a representative identifier throughput information; wherein the set of quality of service parameters comprise one or more indications of a guaranteed bit rate, a maximum bit rate, a delay time, and a packet loss; wherein the set of transcoding parameters comprise one or more indications of a codec parameter, a bandwidth, a frame rate, a Multipurpose Internet Mail Extensions (MIME) type, a height for vertical rendering of the streaming media content, and a width for horizontal rendering of the streaming media content.

9. The network device of claim 1, further comprising:
a congestion component configured to detect a congestion event related to the delivery of the streaming media content to the client device based on a network measurement or the set of metric and status messages via the client-to-DANE interface component, and trigger the modification of the streaming media content via the content adaptation component.

10. The network device of claim 1, wherein the content adaptation component is further configured to generate the modification of the media presentation of the sequence of segments during the delivery of the streaming media content to the client device by changing versions of the streaming media content stored in the memory based on the set of metric and status messages from the client device and the set of parameters on one or more PED messages that relate to a network congestion from the media origin server via a DANE server interface component.

11. The network device of claim 10, wherein the versions comprise different configurations of the streaming media content based on at least one of a bit rate, a frame rate, a resolution, or a codec type.

12. The network device of claim 1, wherein the DANE server comprises a proxy server that is communicatively coupled to the client device at a final network hop via the client-to-DANE interface component and a DANE-to-client interface component, wherein the DANE-to-client interface component is configured to transmit parameters enhancing reception (PER) messages to the client device that comprise an indication of a throughput, an indication of a quality of service, and a set of transcoding parameters that enable transcoding operations to be offloaded from the media origin server.

13. A system for a dynamic adaptive streaming over hypertext transfer protocol (DASH) assisting network element (DANE) of an evolved NodeB (eNB), comprising:
a media path interface configured to receive streaming media content and provide a delivery of the streaming media content via a hypertext transfer protocol (HTTP) channel in response to a client request for a client device to render in a display;

a client-to-DANE interface configured to receive a set of metric and status messages concurrent with or during the delivery of the streaming media content;

a memory storing executable instructions that execute one or more computer executable components; and a processor configured to execute the executable instructions for the one or more executable components, comprising:

a content adaptation component configured to generate a modification including a transcoding or a transrating of at least one of: the delivery of the streaming media content, the streaming media content, or a media presentation configuration of the streaming media content, based on the set of metric and status messages for the client device to render in the display.

14. The system of claim 13, wherein the set of metric and status messages comprise a media configuration requests, a network measurement, or a client device parameter;

wherein the media configuration requests comprise a client device application or user preference request related to a media player of the client device including a throughput request or a quality of service request;

wherein the network measurement comprises a quality of service indication including a load congestion, a buffer rate, a received signal strength indication (RSSI), a network link quality, a delay, a backhaul rate, a bit rate, or a packet loss; and wherein the client device parameter comprises a device capability parameter, a traffic requirement, a mobility parameter or a transcoding parameter that enables a transcoding operation based on an indication of a codec parameter, a bandwidth, a frame rate, a frame width, a frame height, or a Multipurpose Internet Mail Extensions (MIME) type.

15. The system of claim 13, further comprising:

a DANE server interface configured to communicate one or more parameter enhancing delivery (PED) messages that facilitate the delivery, the streaming media content, or the media presentation configuration of the streaming media content, wherein the PED messages comprise parameters including a quality of service parameter, a bandwidth parameter, and a transcoding parameter for a transcoding operation to be offloaded from a media originating server; and a DANE-to-client interface configured to transmit one or more parameter enhancing reception (PER) messages to the client device that comprise an indication of a throughput, an indication of the quality of service parameter, and an indication of the transcoding parameter, which enables the client device to affect the modification via the set of metric and status messages by the client-to-DANE interface based on the one or more PER messages.

16. The system of claim 15, wherein the content adaptation component is further configured to generate the modification of the media presentation configuration of a sequence of media segments during the delivery of the streaming media content to the client device by changing a version or a set of configurations of the streaming media content based on the set of metric and status messages via the client-to-DANE interface and the one or more PED messages via the DANE server interface.

17. The system of claim 16, wherein the version or the set of configurations comprises at least one of: a bit rate, a frame rate, a resolution, or a codec type, which is different from the streaming media content from the delivery.

18. The system of claim 15, wherein the eNB comprises a DANE server communicatively coupled to the client device as a final network hop via the client-to-DANE interface and the DANE-to-client interface, wherein the client-to-DANE interface and the DANE-to-client interface comprise a unidirectional interface, and the media path interface comprises a bi-directional interface.

19. A system for a dynamic adaptive streaming over hypertext transfer protocol (DASH) assisting network element (DANE) of a user equipment (UE) comprising:

a media path interface configured to provide a client request and receive streaming media content in a hypertext transfer protocol (HTTP) in response to the client request;

a client-to-DANE interface configured to provide a set of metric and status messages concurrent with receiving the streaming media content, wherein the set of metric and status messages comprises a change of at least one parameter related to rendering the streaming media content in a display;

a memory storing executable instructions that execute one or more computer executable components; and a processor configured to execute the executable instructions for the one or more executable components, comprising:

a content adaptation component configured to receive, in response to providing the set of metric and status messages, a modification including a transcoding or a transrating of the streaming media content or a media presentation of the streaming media content to smoothly render a modified streaming media content in a media sequence with the streaming media content in the display.

20. The system of claim 19, further comprising:

a DANE-to-client interface configured to receive one or more parameter enhancing reception (PER) messages that comprise an indication of a throughput, an indication of a quality of service, and an indication of a transcoding parameter, which provide a set of parameters available for adjustment to affect the modification by the set of metric and status messages via the client-to-DANE interface.

21. A computer-readable media comprising executable instructions that, in response to execution, cause a system for a dynamic adaptive streaming over hypertext transfer protocol (DASH) assisting network element (DANE) of an evolved NodeB (eNB) comprising one or more processors configured to perform operations comprising:

generating a transmission of streaming media content, via a media path interface, in a hypertext transfer protocol in response to a client request from a client device for rendering in a display of the client device;

receiving, via a client-to-DANE interface, a set of metric and status messages concurrent with the transmission of the streaming media content;

generating a modification of the transmission, a version of the streaming media content, or a media presentation configuration of the streaming media content, based on the set of metric and status messages.

22. The computer-readable media of claim 21, wherein the operations further comprise:

receiving, via the media path interface, the streaming media content from a media origin server based on one or more parameter enhancing delivery (PED) messages being communicated via a DANE server interface, wherein the PED messages comprise one or more quality of service parameters, one or more bandwidth parameters, and one or more transcoding parameters for transcoding operations to be offloaded from the media origin server to the eNB; and transmitting, via a DANE-to-client interface, one or more parameter enhancing reception (PER) messages to the client device that comprise an indication of a throughput, an indication of a quality of service, and an indication of a transcoding parameter, which enables the client device to affect the modification via the set of metric and status messages via the client-to-DANE interface based on the one or more PER messages.

23. The computer-readable media of claim 22, wherein the one or more quality of service parameters comprise one or more indications of a guaranteed bit rate, a maximum bit rate, a delay time, and a packet loss; the one or more bandwidth parameters comprise a minimum bandwidth, a maximum bandwidth, and a client identifier (ID); and the one or more transcoding parameters comprise a codec parameter, a bandwidth, a frame rate, a Multipurpose Internet Mail Extensions (MIME) type, a frame height, and a frame width for rendering of the streaming media content at the display.

* * * * *